(12) United States Patent
Miyauchi et al.

(10) Patent No.: US 7,733,612 B2
(45) Date of Patent: Jun. 8, 2010

(54) GMR DEVICE OF THE CPP STRUCTURE, THIN-FILM MAGNETIC HEAD, HEAD GIMBAL ASSEMBLY, AND HARD DISK SYSTEM

(75) Inventors: Daisuke Miyauchi, Tokyo (JP); Takahiko Machita, Tokyo (JP)

(73) Assignee: TDK Corporation, Tokyo (JP)

( * ) Notice: Subject to any disclaimer, the term of this patent is extended or adjusted under 35 U.S.C. 154(b) by 511 days.

(21) Appl. No.: 11/773,651

(22) Filed: Jul. 5, 2007

(65) Prior Publication Data

US 2008/0013223 A1 Jan. 17, 2008

(30) Foreign Application Priority Data

Jul. 14, 2006 (JP) ............... 2006-193698

(51) Int. Cl.
*G11B 5/39* (2006.01)
(52) U.S. Cl. ................................. 360/324.11
(58) Field of Classification Search ............. 360/324.1, 360/324.11, 324.12
See application file for complete search history.

(56) References Cited

U.S. PATENT DOCUMENTS

| | | | | |
|---|---|---|---|---|
| 6,639,762 B2 * | 10/2003 | Saito et al. | ............... | 360/314 |
| 6,678,128 B2 * | 1/2004 | Saito et al. | ............. | 360/324.11 |
| 6,700,756 B1 * | 3/2004 | Hasegawa | ............. | 360/324.12 |
| 6,856,494 B2 * | 2/2005 | Ooshima et al. | ....... | 360/324.12 |
| 7,365,949 B2 * | 4/2008 | Hayakawa et al. | ........ | 360/324.1 |
| 2004/0190205 A1 * | 9/2004 | Miyauchi | ................. | 360/324.1 |
| 2005/0174692 A1 | 8/2005 | Miyauchi et al. | | |
| 2006/0203397 A1 | 9/2006 | Mizuno et al. | | |

FOREIGN PATENT DOCUMENTS

| | | |
|---|---|---|
| JP | 2000-91667 | 3/2000 |
| JP | 2001-56908 | 2/2001 |
| JP | 2003-86862 | 3/2003 |
| JP | 2003-178406 | 6/2003 |
| JP | 2005-223193 | 8/2005 |
| JP | 2005-294376 | 10/2005 |
| JP | 2006-80144 | 3/2006 |

* cited by examiner

*Primary Examiner*—Mark Blouin
(74) *Attorney, Agent, or Firm*—Oblon, Spivak, McClelland, Maier & Neustadt, L.L.P.

(57) ABSTRACT

In the GMR device of the CPP structure using the synthetic pinned layer as the fixed magnetization layer (pinned layer), the width W1 of the inner pin layer is set at 50 nm or less; the fixed magnetization layer is configured in such a way as to have a given angle range of tapers at both its ends as viewed from the medium opposite plane; the magnetic volume ratio between the inner and the outer pin layer is allowed to lie in the range of 0.9 to 1.1; and the magnetic thickness ratio between the inner and the outer pin layer is set at 0.8 or less. It is thus possible to make the outer pin layer thin at no cost of the thickness of the inner pin layer forming a part of the synthetic pinned layer yet without doing damage to the function of the synthetic pinned layer itself, viz., resistance to an external magnetic field.

12 Claims, 9 Drawing Sheets

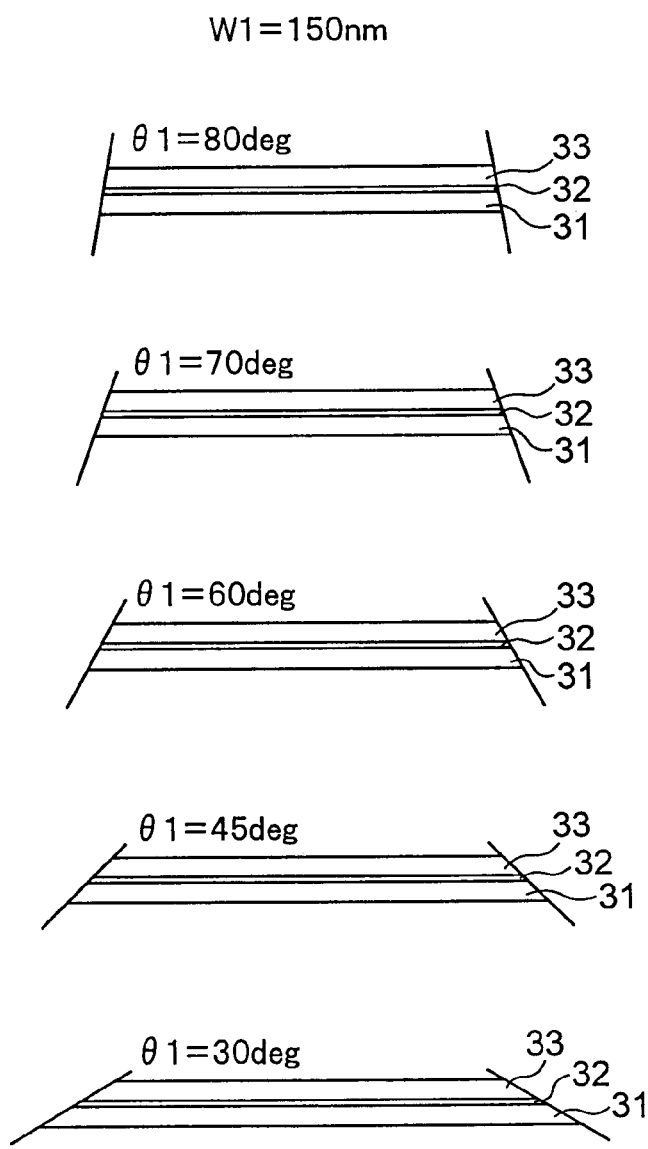

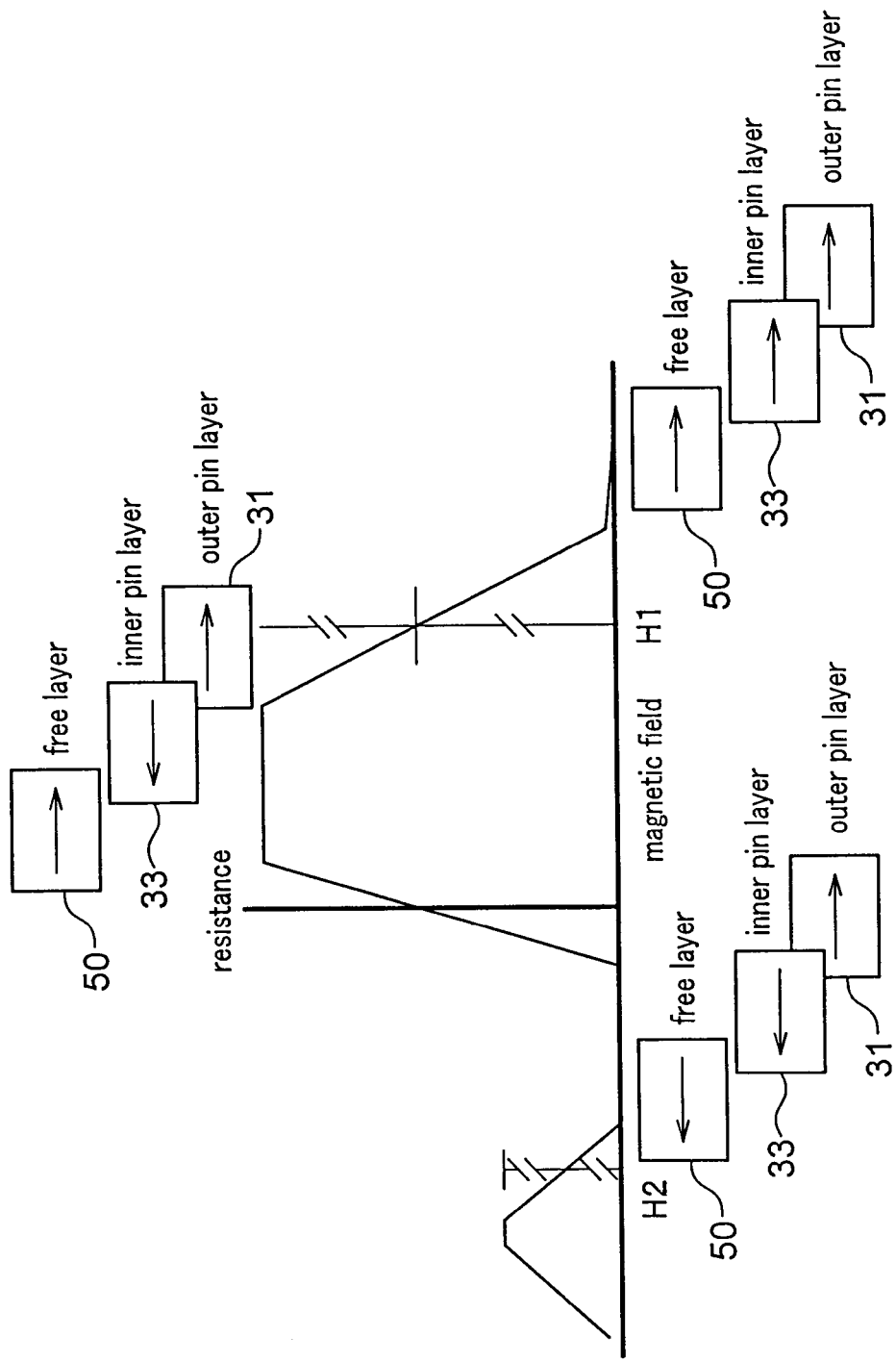

GMR DEVICE OF THE CPP STRUCTURE, THIN-FILM MAGNETIC HEAD, HEAD GIMBAL ASSEMBLY, AND HARD DISK SYSTEM

BACKGROUND OF THE INVENTION

1. Field of the Invention

The present invention relates to a GMR device of the CPP structure for reading the magnetic field strength of a magnetic recording medium or the like as signals, a thin-film magnetic head comprising that device, and a head gimbal assembly and a magnetic disk system comprising that thin-film magnetic head.

2. Explanation of the Prior Art

With recent improvements in the plane recording density of hard disk systems, there has been growing demands for improvements in the performance of thin-film magnetic heads. For the thin-film magnetic head, a composite type thin-film magnetic head has gained great popularity, which has a structure wherein a reproducing head having a read-only magneto-resistive effect device (hereinafter often referred to as the MR device for short) and a recording head having a write-only induction type magnetic device are stacked together on a substrate.

For the MR device, there is the mention of an AMR device harnessing an anisotropic magneto-resistive effect, a GMR device harnessing a giant magneto-resistive effect, a TMR device harnessing a tunnel-type magneto-resistive effect, and so on.

The reproducing head is required to have high sensitivity and high outputs in particular. GMR heads using a spin valve type GMR device have already been mass-produced as a reproduction head possessing such performances, and to meet further improvements in plane recording densities, reproducing heads using TMR devices are now being mass-produced, too.

In general, the spin valve type GMR device comprises a nonmagnetic layer, a free layer formed on one surface of that nonmagnetic layer, a fixed magnetization layer formed on another surface of the nonmagnetic layer, and a pinning layer (generally an antiferromagnetic layer) on the side of the fixed magnetization layer facing away from the non-magnetic layer. The free layer has its magnetization direction changing depending on an external signal magnetic field, and the fixed magnetization layer has its magnetization direction fixed by a magnetic field from the pinning layer (antiferromagnetic layer). The fixed magnetization layer has, in its preferable aspect, a synthetic pinned layer comprising a nonmagnetic intermediate layer sandwiched between an inner layer and an outer layer.

Common GMR heads used so far in the art have a CIP (current in plane) structure wherein a current for detecting magnetic signals (the so-called sense current) is passed parallel with the plane of each of the layers forming the GMR device. On the other hand, GMR devices having the so-called CPP (current perpendicular to plane) structure wherein the sense current is passed perpendicularly to the plane of each of the layers forming the GMR device (that will often be called the CPP-GMR device for short), too, are now under development as next-generation ones. Note here that the aforesaid TMR devices, too, would come under the wide category of CPP structures.

The CPP-GMR device is expected to have ever higher potentials for the reasons that it is lower in resistance than the CPP-TMR device, and higher in output at a narrow track width than the CIP (current in plane)-GRM device.

The CPP-GMR device comprises, in its basic structure, a spin valve multilayer film wherein the antiferromagnetic layer acting as a pinning layer, the fixed magnetization layer as a pinned layer, the nonmagnetic spacer layer and the free layer are stacked together in order. And a pair of opposed shield layers are formed in such a way as to sandwich between them that spin valve multilayer film vertically in the stacking direction. Usually, that pair of shield layers are designed to function also as electrodes for passing the sense current in the stacking direction.

And now, for the fixed magnetization layer (pinned layer) of the spin valve multilayer film, there is a synthetic pinned layer used, wherein ferromagnetic layers are stacked together with a nonmagnetic intermediate layer of Ru, Rh or the like held between them. In this arrangement wherein the two ferromagnetic layers with the nonmagnetic intermediate layer held between them are anti-ferromagnetically coupled to each other, the magnetization of the fixed magnetization layer (pinned layer) is held back and stabilized because they remain mutually anti-parallel. When the spin valve multilayer film is used as a head's read device, it is possible to get around a displacement of the bias point due to a magnetostatic field from the fixed magnetization layer (pinned layer).

For such a reason, the magnetic moments of the two ferromagnetic layers forming part of the synthetic pinned layer must be well balanced. As this balance is thrown off, it will give rise to an increase in the net moment of either one of the two ferromagnetic layers, causing magnetization to become unstable against an external magnetic field. Of the two ferromagnetic layers forming part of the synthetic pinned layer, one (pinned layer) nearer to the nonmagnetic spacer layer will be called the inner pin layer, whereas one (pin layer) far away from it will be called the outer pin layer. It is the inner pin layer that contributes to the magneto-resistive effect; the outer pin layer serves to exclusively stabilize the magnetization of the pinned layer.

With the CPP-GMR device, by the way, there is the bulk scattering effect contributing much to the magneto-resistive effect. In other words, in the CIP-GMR device for comparison, the direction (conduction) of sense current flow lies in the film plane so that there is plenty of resistance change obtainable due to spin dependent scattering at the interface. With the CPP-GMR device, on the other hand, the sense current flows perpendicularly to the film plane, viz., the interface; that is, it passes through the interface, contributing less to that magneto-resistive effect. Further, because an ordinary GMR film has as little as two interfaces: the upper and lower planes of the nonmagnetic spacer layer, the contribution of the interfaces is particularly limited. For this reason, the magnetic layer should preferably be thicker to obtain high MR change rates.

In the meantime, the inter-shield gap must be as narrow as possible to achieve higher recording densities; the fixed magnetization layer (pinned layer) should preferably be thin. From such a point of view, if the thickness of the outer pin layer that makes no contribution to the magneto-resistive effect can be thin without sacrificing the thickness of the inner pin layer that contributes to the magneto-resistive effect, it would then be possible to make the inter-shield gap narrow while the resistance change is kept as such.

The situations being like this, an object of the invention is to provide a GMR device of the CPP structure using the synthetic pinned layer as the fixed magnetization layer (pinned layer), wherein the thickness of the outer pin layer is reduced at no cost of the thickness of the inner pin layer forming a part of the synthetic pinned layer and without doing damage to the function of the synthetic pinned layer per se, viz., resistance to an external magnetic field, thereby achieving higher recording densities.

SUMMARY OF THE INVENTION

According to the invention, that object is achieved by the provision of a giant magneto-resistive effect device (GMR device) having a CPP (current perpendicular to plane) structure comprising a nonmagnetic spacer layer, and a fixed magnetized layer and a free layer stacked one upon another with said nonmagnetic spacer layer interleaved between them, with a sense current applied in a stacking direction, wherein:

said free layer functions such that a direction of magnetization changes depending on an external magnetic field, and said fixed magnetization layer has a synthetic pinned morphology wherein an inner pin layer and an outer pin layer are stacked one upon another with a nonmagnetic intermediate layer held between them, said inner pin layer being located at a position nearer to said nonmagnetic spacer layer than to said outer pin layer, wherein:

the width W1 of said inner pin layer at a position tangent to said nonmagnetic spacer layer as viewed from a medium opposite plane is set at 50 nm or less, said fixed magnetization layer has tapers at both ends as viewed from the medium opposite plane, each of said tapers is tapered down to said non-magnetic spacer layer with the stacking direction of said device as a center axis direction, wherein the taper angle θ1 with respect to a reference line defined by a stacking plane as viewed from a medium opposite plane side is set in an angle range of 40° to 60°, the magnetic volume ratio (Mso×V2)/(Msi×V1), represented by the ratio of (Mso×V2) that is a product of the saturation magnetization Mso and volume V2 of said outer pin layer relative to (Msi×V1) that is a product of the saturation magnetization Msi and volume V1 of said inner pin layer, lies in a range of 0.9 to 1.1, and the magnetic thickness ratio (Mso×t2)/(Msi×t1), represented by the ratio of (Mso×t2) that is a product of the saturation magnetization Mso and thickness t2 of said outer pin layer relative to (Msi×t1) that is a product of the saturation magnetization Msi and thickness t1 of said inner pin layer, is set at 0.8 or less.

In one preferable aspect of the GMR device of the CPP structure according to the invention, the width W1 of an upper end portion of said inner pin layer is 10 to 50 nm.

In another preferable aspect of the GMR device of the CPP structure according to the invention, said taper angle θ1 is set in the angle range of 45 to 55°.

In yet another preferable aspect of the GMR device of the CPP structure according to the invention, said fixed magnetization layer has a slant at an end face in a depth direction as viewed from a section perpendicular to the medium opposite plane, wherein said slant has a morphology that is tapered down to said nonmagnetic spacer layer and an angle of inclination θ2 with a reference as the stacking plane, wherein said angle of inclination θ2 is set in an angle range of 40° to 60°.

In a further preferable aspect of the GMR device of the CPP structure according to the invention, said inner pin layer has a length L1 in a depth direction at a position tangent to said nonmagnetic spacer layer and at an end face in a depth direction as viewed from a section perpendicular to the medium opposite plane, wherein said length L1 is set at 50 nm or less.

In a further preferable aspect of the GMR device of the CPP structure according to the invention, the length L1 of an upper end portion of said inner pin layer is 10 to 50 nm.

In a further preferable aspect of the GMR device of the CPP structure according to the invention, said outer pin layer comprises a ferromagnetic layer having a fixed direction of magnetization, and the direction of magnetization of said inner pin layer is fixed in a direction (antiparallel direction) opposite to the direction of magnetization of the ferromagnetic layer in said outer pin layer.

In a further preferable aspect of the GMR device of the CPP structure according to the invention, the direction of magnetization of the ferromagnetic layer in said outer pin layer is fixed by the action of an anti-ferromagnetic layer formed tangent to said outer pin layer.

In a further preferable aspect of the GMR device of the CPP structure according to the invention, said nonmagnetic spacer layer is made of an electroconductive material.

The invention also provides a thin-film magnetic head, comprising:

a plane opposite to a recoding medium, said GMR device of the CPP structure, which is located near said medium opposite plane for detecting a signal magnetic field from said recording medium, and a pair of electrodes for passing a current in the stacking direction of said magneto-resistive effect device.

Further, the invention provides a head gimbal assembly, comprising:

a slider including said thin-film magnetic head and located in opposition to a recording medium, and a suspension adapted to resiliently support said slider.

Furthermore, the invention provides a hard disk system, comprising:

a slider including said thin-film magnetic head and located in opposition to a recording medium, and a positioning means adapted to support and position said slider with respect to said recording medium.

In the GMR device of the CPP structure using the synthetic pinned layer as the fixed magnetization layer (pinned layer), the width W1 of the inner pin layer is set at 50 nm or less; the fixed magnetization layer is configured in such a way as to have a given angle range of tapers at both its ends as viewed from the medium opposite plane; the magnetic volume ratio between the inner and the outer pin layer is allowed to lie in the range of 0.9 to 1.1; and the magnetic thickness ratio between the inner and the outer pin layer is set at 0.8 or less. It is thus possible to make the outer pin layer thin at no cost of the thickness of the inner pin layer forming a part of the synthetic pinned layer yet without doing damage to the function of the synthetic pinned layer itself, viz., resistance to an external magnetic field. This in turn permits the inter-shield gas to be narrowed with the achievement of ever higher recording densities.

BRIEF EXPLANATION OF THE DRAWINGS

FIG. 11A is conceptually illustrative of the morphologies of the fixed magnetization layer with varying taper angles θ1 of 80°, 70°, 60°, 45° and 30° in the device with W1=150 nm, and FIG. 11B is conceptually illustrative of the morphologies of the fixed magnetization layer with varying taper angles θ1 of 80°, 70°, 60°, 45° and 30° in the device with W1=50 nm.

FIG. 12 is a graph indicative of the resistance vs. magnetic field curve for the device.

DETAILED EXPLANATION OF THE INVENTION

The best mode for carrying out the invention is now explained in details.

Figure 1:
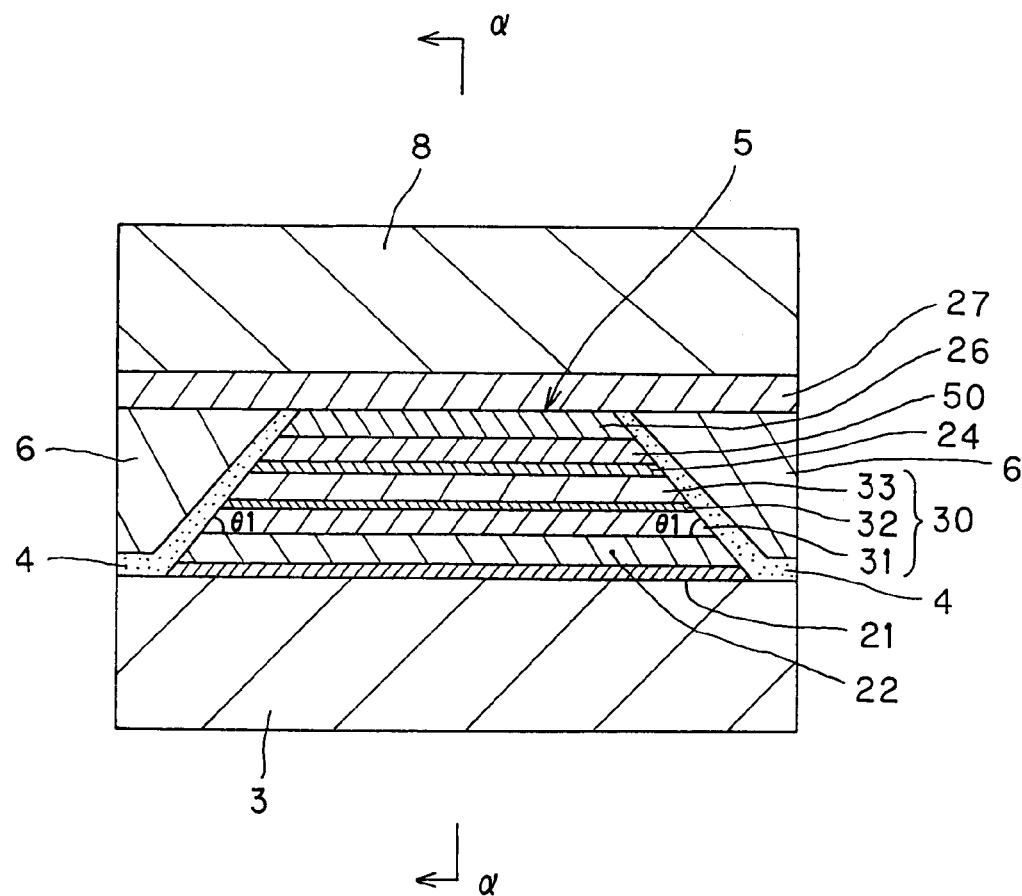
FIG. 1 is illustrative in schematic of the ABS (air bearing surface) of the reproducing head in one embodiment of the invention in general, and the ABS of the GMR device of the CPP structure that is part of the invention in particular.

FIG. 1 is generally illustrative of the ABS (air bearing surface) of the reproducing head in an embodiment of the invention; FIG. 1 is illustrative in schematic of the ABS of the GMR device of the CPP structure—part of the invention. The "ABS" is generally corresponding to a plane (hereinafter often called the medium opposite plane) at which a reproducing head is in opposition to a recording medium; however, it is understood that the "ABS" here includes even a section at a position where the multilayer structure of the device can be clearly observed. For instance, a protective layer such as DLC or the like (the protective layer adapted to cover the device), in a strict sense, positioned facing the medium opposite plane may be factored out, if necessary.

Figure 2:
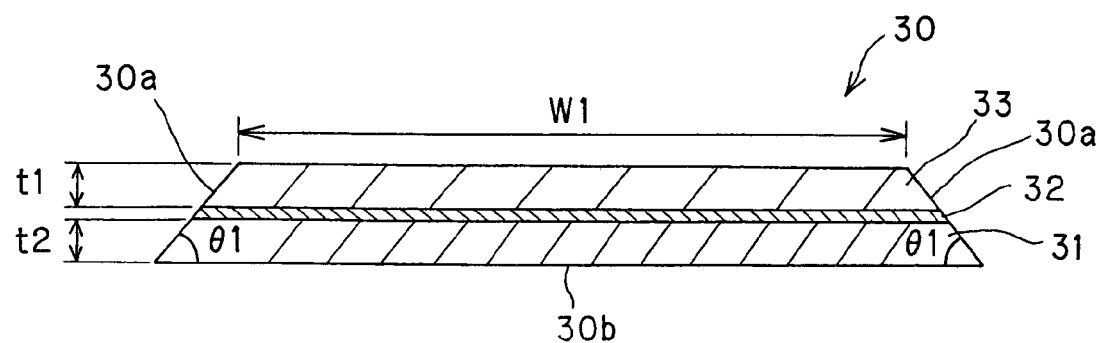
FIG. 2 is an enlarged view of a part of only the fixed magnetization layer illustrated in FIG. 1.
Figure 3:
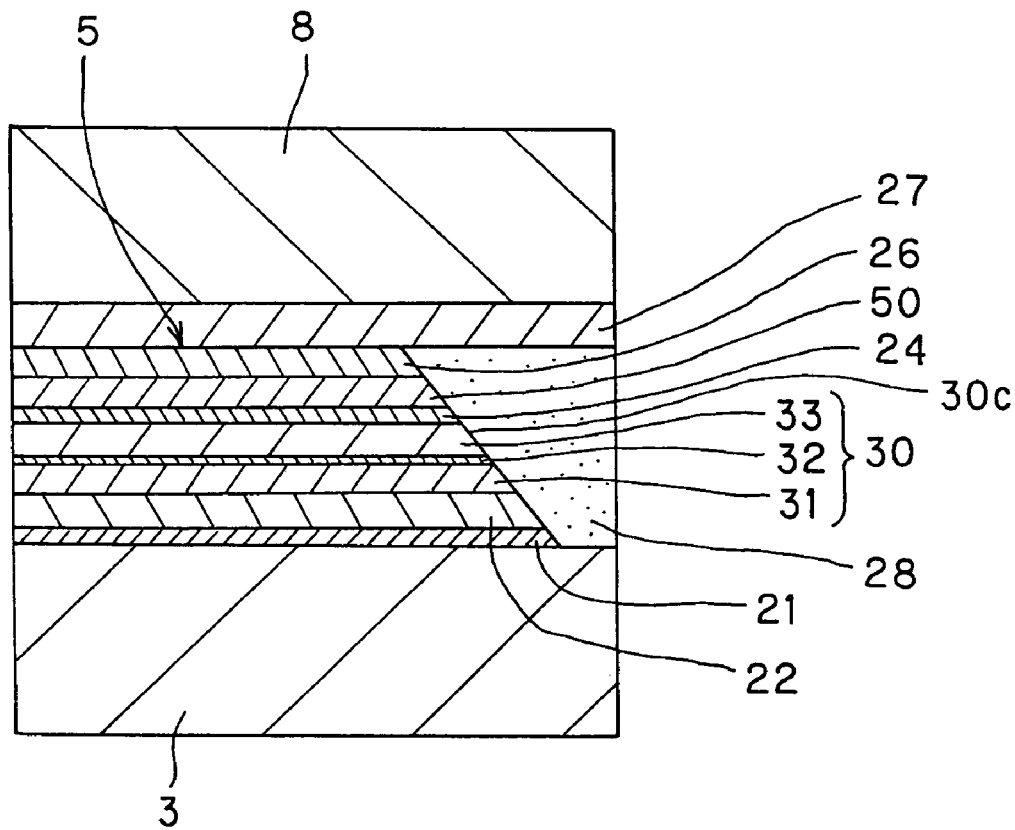
FIG. 3 is a sectional view perpendicular to the ABS of FIG. 1; it is a sectional view as taken on arrows α-α of FIG. 1.
Figure 4:
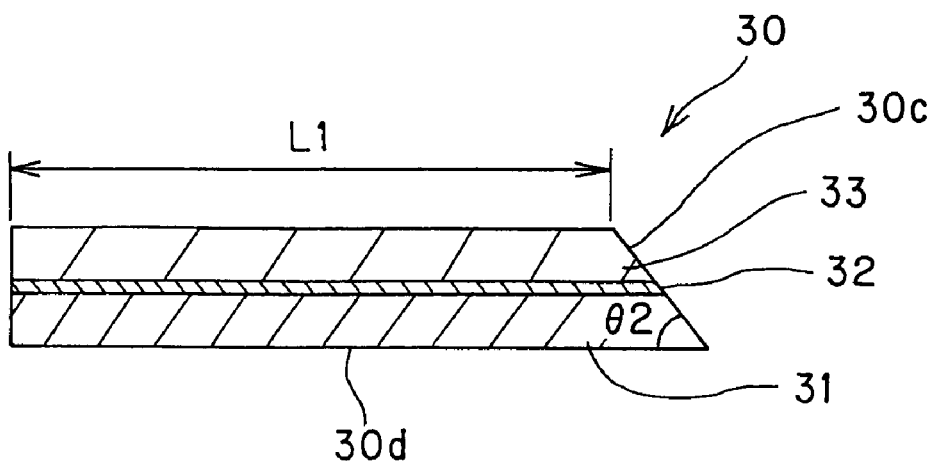
FIG. 4 is an enlarged view of a part of only the fixed magnetization layer illustrated in FIG. 3.

FIG. 2 is an enlarged view of a part of only the fixed magnetization layer 30 illustrated in FIG. 1; FIG. 3 is illustrative of a section perpendicular to the ABS of FIG. 1 or it is a sectional view as taken on arrows α-α of FIG. 1; and FIG. 4 is an enlarged view of a part of only the fixed magnetization layer 30 illustrated in FIG. 3.

Figure 5:
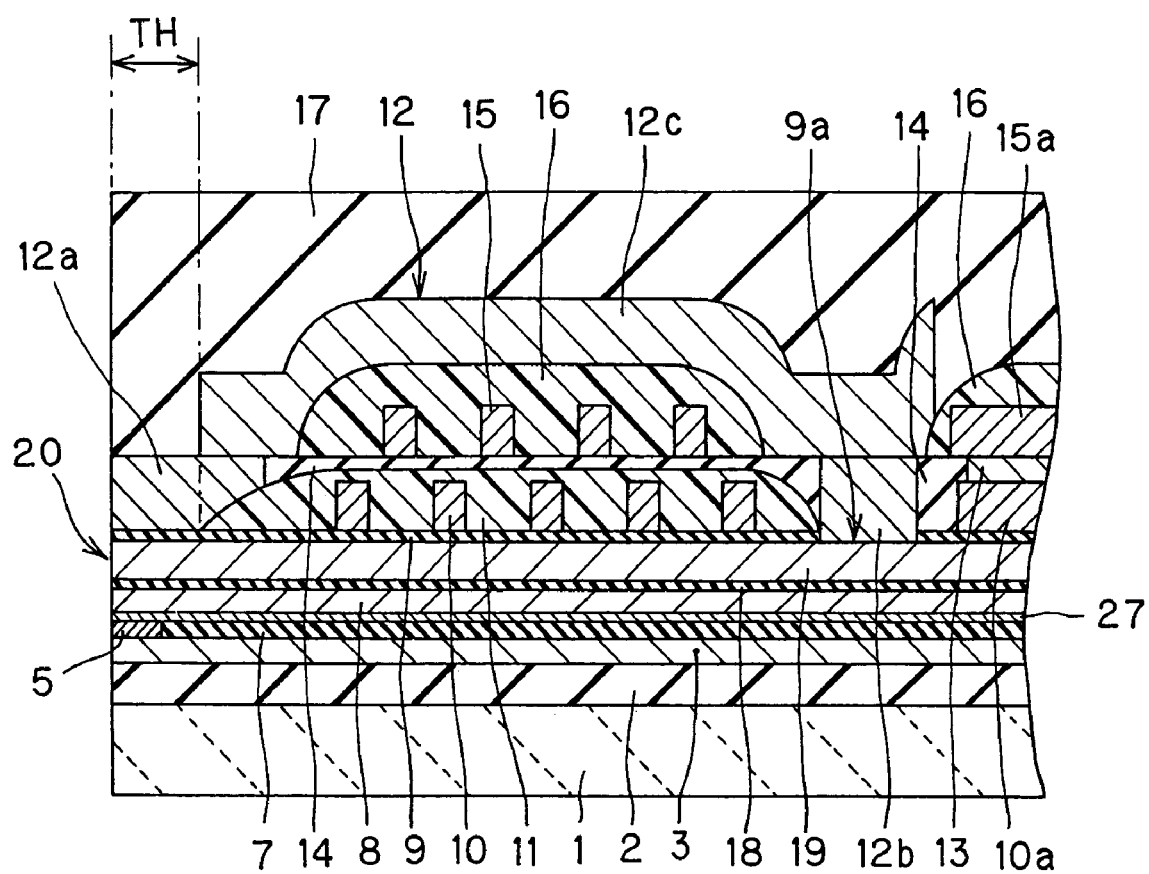
FIG. 5 is illustrative of the construction of a thin-film magnetic head according to one preferable embodiment of the invention; it is a sectional view illustrative of the ABS of the thin-film magnetic head and a section thereof perpendicular to a substrate.
Figure 6:
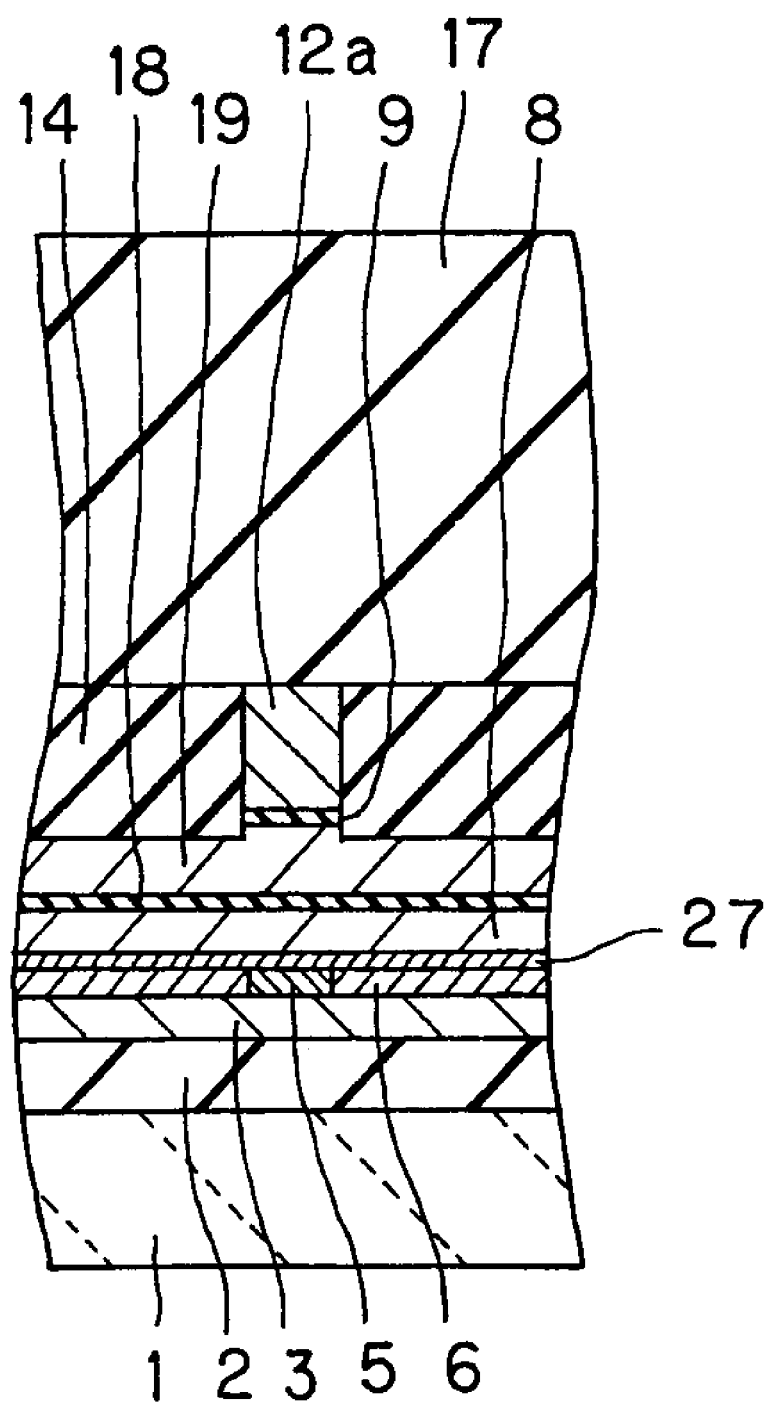
FIG. 6 is illustrative of the construction of the thin-film magnetic head according to one preferable embodiment of the invention; it is a sectional view illustrative of a section of a magnetic pole portion of the thin-film magnetic head parallel with the ABS.
Figure 7:
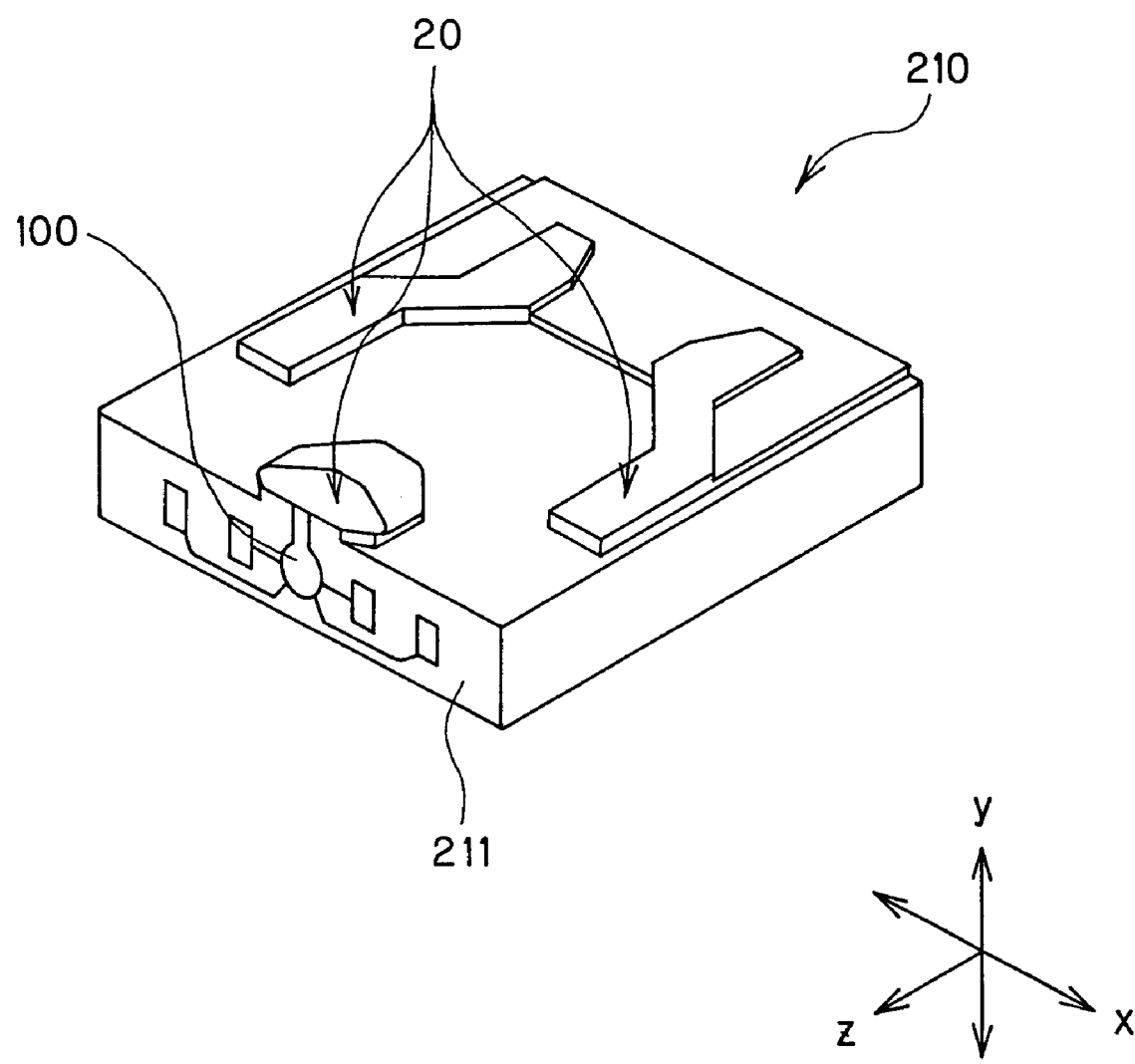
FIG. 7 is a perspective view of a slider built in the head gimbal assembly according to one embodiment of the invention.
Figure 8:
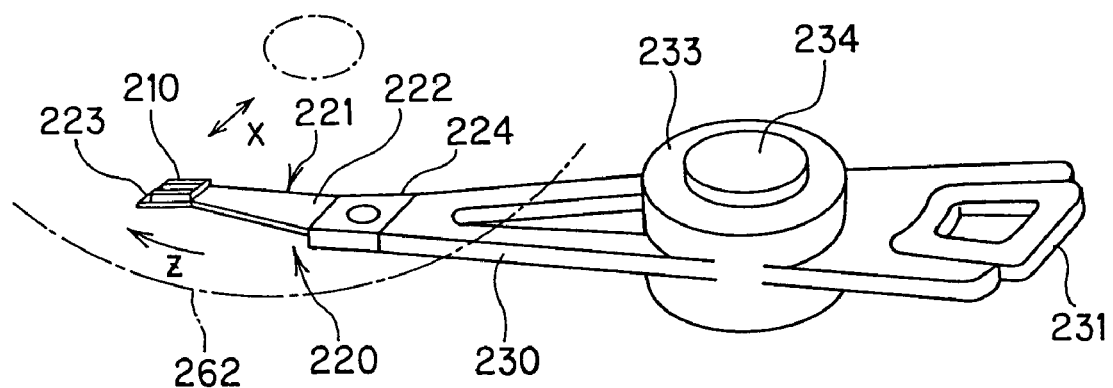
FIG. 8 is a perspective view of a head arm assembly including the head gimbal assembly according to one embodiment of the invention.
Figure 9:
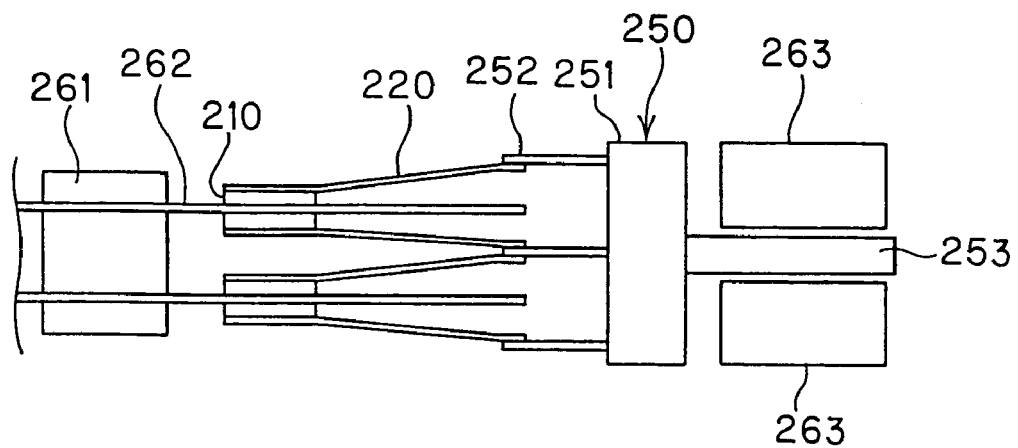
FIG. 9 is illustrative of part of the hard disk system according to one embodiment of the invention.
Figure 10:
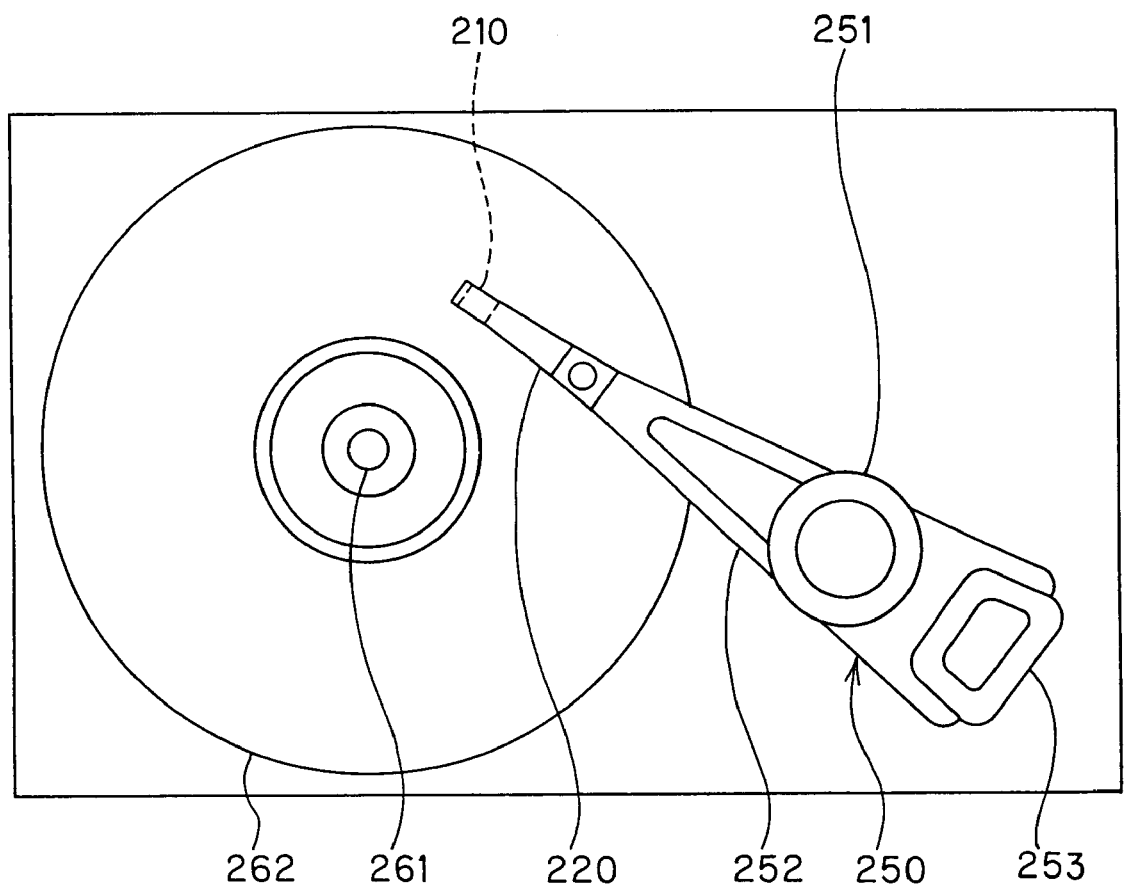
FIG. 10 is a plan view of the hard disk system according to one embodiment of the invention.

FIG. 5 is illustrative of the construction of a thin-film magnetic head according to one preferable embodiment of the invention or it is a sectional view illustrative of the ABS of the thin-film magnetic head and a section thereof perpendicular to a substrate; FIG. 6 is illustrative of the construction of the thin-film magnetic head according to one preferable embodiment of the invention or it is a sectional view illustrative of a section of a magnetic pole portion of the thin-film magnetic head parallel with the ABS; FIG. 7 is a perspective view of a slider built in the head gimbal assembly according to one embodiment of the invention; FIG. 8 is a perspective view of a head arm assembly including the head gimbal assembly according to one embodiment of the invention; FIG. 9 is illustrative of part of the hard disk system according to one embodiment of the invention; and FIG. 10 is a plan view of the hard disk system according to one embodiment of the invention.

[GMR Device of the CPP Structure]

The construction of the reproducing head comprising the inventive GMR device of the CPP structure is now explained in details with reference to FIG. 1.

As noted above, FIG. 1 is a sectional view corresponding to a section of the reproducing head parallel with the medium opposite plane.

As shown in FIG. 1, the reproducing head according to the embodiment here comprises a first shield layer 3 and a second shield layer 8 that are opposed to each other at a given space, a GMR device 5 of the CPP structure (hereinafter referred simply to as the CPP-GMR device 5) disposed between the first shield layer 3 and the second shield layer 8, an insulating film 4 adapted to cover two sides of the CPP-GMR device 5 and a part of the upper surface of the first shield layer 3 along these sides, and two bias magnetic field-applying layers 6 adjacent to the two sides of the CPP-GMR device 5 via the insulating layer 4.

The first 3 and the second shield layer 8 take a so-called magnetic shield role plus a pair-of-electrodes role. In other words, they have not only a function of shielding magnetism but also function as a pair of electrodes adapted to pass a sense current through the CPP-GMR device in a direction intersecting the plane of each of the layers forming the CPP-GMR device 5, that is, in a direction perpendicular to the plane of each of the layers forming the GMR device (stacking direction).

In the embodiment of the invention here, there is a nonmagnetic metal layer 27 (that will often be called the "metal gap") formed between the CPP-GMR device 5 and the second shield layer 8. The nonmagnetic metal layer 27 (the "metal gap") is provided to adjust the distance between the free layer and the shield. Preferably, there is a free layer present at substantially the center of the inter-shield gap so that the position of that free layer, viz., the spacing is adjusted by that nonmagnetic metal layer 27 (the "metal gap"). Thus, by making an outer pin layer 31 thin, the nonmagnetic metal layer 27 (the "metal gap") can be so thinned that the inter-shield gas can be narrowed by that much. As can also be seen from the experimental examples given later, the characteristics PW50 (the half-amplitude of output waveform) are improved, too.

The CPP-GMR device 5—part of the invention—is now explained at great length.

The CPP-GMR device 5 of the invention comprises a nonmagnetic spacer layer 24, and a fixed magnetization layer 30 and a free layer 50 that are stacked one upon another with the nonmagnetic spacer layer 24 held between them. And then, a sense current is applied to the CPP-GMR device 5 in its stacking direction to enable its function. In short, there is the GMR device 5 of the CPP (current perpendicular to plane) involved.

The free layer 50 has its magnetization direction changing dependent on an external magnetic field, viz., a signal magnetic field from a recording medium, while the fixed magnetization layer 30 has its magnetization direction remaining fixed under the action of an anti-ferromagnetic layer 22.

(Explanation of the Fixed Magnetization Layer 30)

In the invention, the fixed magnetization layer 30 is formed on the antiferromagnetic layer 22 having a pinning action via an underlay layer 21 formed on the first shield layer 3. That fixed magnetization layer 30 has a so-called synthetic pinned layer comprising, in order from the side of the antiferromagnetic layer 22, an outer pin layer 31, a nonmagnetic intermediate layer 32 and an inner pin layer 33, all stacked together in order.

In the arrangement of the synthetic pinned layer, the two layers or the outer 31 and the inner pin layer 33 with the nonmagnetic intermediate layer 32 held between them are antiferromagnetically coupled to each other. The magnetization of the fixed magnetization layer (pinned layer) is held back and stabilized because they remain mutually antiparallel. When such arrangement is used as a head's read device, it is possible to get around a displacement of the bias point due to a magnetostatic field from the fixed magnetization layer (pinned layer).

For such a reason, the magnetic moments of the outer 31 and the inner pin layer 33 forming part of the synthetic pinned layer must be well balanced. As this balance is thrown off, it will give rise to an increase in the net moment of either one of the two layers 31, 33, causing magnetization to become unstable against an external magnetic field. Of the two ferromagnetic layers forming part of the synthetic pinned layer, one (pinned layer) nearer to the nonmagnetic spacer layer 24 is here called the inner pin layer 33, whereas one far away from it is called the outer pin layer 31. It is the inner pin layer 33 that contributes to the magneto-resistive effect; the outer pin layer 31 serves to exclusively stabilize the magnetization of the pinned layer.

As depicted in FIGS. 1 and 2, the inventive fixed magnetization layer 30 having such arrangement is tapered (FIG. 2) at both its ends 30a, 30a, as viewed from the medium opposite plane side. Specifically, both ends 30a, 30a are tapered down to the nonmagnetic spacer layer 24 with the stacking direction of the device as a center axis direction. And then, when there is a taper angle θ1 involved with respect to a reference line 30b defined by an end (for instance, indicated by reference numeral 30b in FIG. 2) of the stacking plane as viewed from the medium opposite plane, as shown in FIGS. 1 and 2, that θ1 is set in the range of 40° to 60°, preferably 45° to 55°.

In addition, the inner pin layer 33 in the inventive fixed magnetization layer 30 is set such that, as shown in FIG. 2, its width W1 at a position tangent to the non-magnetic spacer layer 24 as viewed from the medium opposite plane is up to 50 nm, preferably 10 to 50 nm, and even more preferably 20 to 50 nm.

Added to this, there is a magnetic volume ratio (Mso×V2/(Msi×V1) set in the range of 0.9 to 1.1, wherein (Msi×V1) is a product of the saturation magnetization Msi and volume V1 of the inner pin layer 33, and (Mso×V2) is a product of the saturation magnetization Mso and volume V2 of the outer pin layer 31. As the value of (Mso×V2/(Msi×V1) is shy of 0.9 or exceeds 1.1, it will throw the magnetic moments off balance; the net moment of either one of the two layers 31 and 33 will grow large, resulting in magnetization being unstable with respect to an external magnetic field. Note here that when both the inner 33 and the outer pin layer 31 are made of the same material, Msi=Mso. In consideration of productivity, both the layers are ordinarily made of the same material, yet it is acceptable that Msi<Mso so as to achieve further reductions in the thickness of the outer pin layer 31.

Furthermore in the invention, there is a magnetic thickness ratio (Mso×t2)/(Msi×t1) set in the range of up to 0.8, especially 0.5 to 0.8, wherein (Msi×t1) is a product of the saturation magnetization Msi and thickness t1 of the inner pin layer 33, and (Mso×t2) is a product of the saturation magnetization Mso and thickness t2 of the outer pin layer 31. The reason for setting that ratio at up to 0.8 is to make the thickness t2 of the outer pin layer 31 at least 20% less than the thickness t1 of the inner pin layer 33, thereby letting the invention take effect.

Note here that when the inner 33 and the outer pin layer 31 are made of the same material, Msi=Mso, as mentioned above.

In the invention, that magnetic thickness ratio and that magnetic volume ratio in such given ranges as mentioned above are set for the following reasons. The objective of the design guidance for the inner 33 and the outer pin layer 31 of the synthetic pinned layer in the prior art is only to put the magnetic thickness ratio in a well-balanced state. The objective of the design guidance for the inner 33 and the outer pin layer 31 in the invention is, on the other hand, to keep balance in terms of the magnetic volume ratio and throw the magnetic thickness ratio a lot more off balance. This in turn makes it possible (1) to maintain pin strength by decreasing the net moment of the pinned layer, and (2) to make the outer pin layer 31 thin while keeping the thickness of the inner pin layer 33 intact, so that the inter-shield gap can be narrowed with a decrease in PW50 (the half-amplitude of output waveform), achieving ever higher recording densities.

As the value of that width W1 exceeds 50 nm, high potentials expected for the CPP-GMR device 5 are unachievable; it is impossible to achieve a device well compatible with an ultra-narrow track width and an ultra-narrow inter-shield gap yet capable of producing high outputs.

The aforesaid angle range for θ1 is set on condition that the width W1 remains less than 50 nm. If the width W1 is about 150 nm, the angle range for θ1 determined according to the invention would be of no or little significance, as can be seen from the experimental examples given later.

As the value of θ1 explained here exceeds 60°, it would be impossible to make the thickness t2 of the outer pin layer 31 less than the thickness t1 of the inner pin layer 33 while there is a pin balance kept between the inner 33 and the outer pin layer 31. As a consequence, it would be impossible to narrow the inter-shield gap—the object of the invention, thereby achieving ever higher recording densities. As the value of θ1 does not reach 40°, on the other hand, it would cause the width of the upper end of the inner pin layer 33 to become too narrow to allow a succession of films stacked on the inner pin layer 33 to function on their merits.

In a more preferable embodiment of the invention, as shown in FIGS. 3 and 4, the fixed magnetization layer 30 has a slant at an end face 30c in a depth direction as viewed from a section perpendicular to the medium opposite plane. That slant has a form tapered down to the non-magnetic intermediate layer 24, and has an angle of inclination θ2 with respect to a reference line 30d defined by a stacking plane (for instance, indicated at reference numeral 30d in FIG. 4) as viewed from the section perpendicular to the medium opposite plane. It is desired that the angle of inclination θ2 be set in the angle range of 40° to 60°. At such an angle of inclination θ2, the outer pin layer is much more thinned so that the inter-shield gap can be much more narrowed with further improvements in the recording densities. Note here that reference numeral 28 in FIG. 3 is indicative of an insulating layer made of alumina or the like.

The inner pin layer 33 is designed such that its depth direction length L1 at a position tangent to the nonmagnetic spacer layer 24 is up to 50 nm, preferably 10 to 50 nm, and more preferably 20 to 50 nm at an end face 3c in the depth direction in the sectional view perpendicular to the medium opposite plane, as shown in FIG. 4. Such a preferable length L1 combines with such a preferable angle of inclination θ2 to work for the effect that the thickness t2 of the outer pin layer 31 can be less than the thickness t1 of the inner pin layer 33 while there is a pin balance kept between the inner 33 and the outer pin layer 31.

The aforesaid taper angle θ1 of the CPP-GMR device may be adjusted by forming a succession of films forming part of the CPP-GMR device on the lower shield layer by means of sputtering or the like, and then milling the multilayer film for the CPP-GMR device using a photo-resist as a mask under appropriately varied conditions. More specifically, while a substrate with a multilayer film formed on it is rotated, the angle of incidence of ion beams on milling, viz., the milling angle or the milling depth may be varied. If the milling angle is kept shallow and the milling depth is kept small, it is then possible to make the taper angle θ1 smaller.

The adjustment of the angle of inclination θ2 at the end face 30c in the depth direction from the section perpendicular to the medium opposite plane, too, may be carried out as is the case with the aforesaid θ1.

The specific construction of each of the aforesaid outer pin layer 31, nonmagnetic intermediate layer 32 and inner pin layer 33 is now explained at great length.

Outer Pin Layer 31

The outer 31 and the inner pin layer 33 are anti-ferromagnetically coupled and fixed such that their magnetization directions are opposite to each other, as described above.

The outer pin layer 31, for instance, is constructed from a ferromagnetic layer made of a Co-containing ferromagnetic material, for which $CO_{70}Fe_{30}$ (atomic %) alloys are preferably mentioned, and has a thickness of about 3 to 7 nm. In the invention, however, the thickness of the outer pin layer 31 is reduced as much as possible. The outer 31 and the inner pin layer 33 may be made of either the same magnetic material or different magnetic materials.

Nonmagnetic Intermediate Layer 32

For instance, the nonmagnetic intermediate layer 32 is made of a nonmagnetic material containing at least one selected from the group consisting of Ru, Rh, Ir, Re, Cr, Zr and Cu, and has a thickness of, for instance, about 0.35 to 1.0 nm. The nonmagnetic intermediate layer 32 is provided to fix the magnetization of the inner pin layer 33 and the magnetization of the outer pin layer 31 in mutually opposite directions. The phrase "magnetization in mutually opposite directions" stands for a broad concept that encompasses just only two such magnetizations in just opposite directions of 180° but also those in different directions of 180°±20° as well.

Inner Pin Layer 33

The inner pin layer 31, for instance, is constructed from a ferromagnetic layer made of a Co-containing ferromagnetic material, for which $CO_{70}Fe_{30}$ (atomic %) alloys are preferably mentioned, and has a thickness of about 3 to 7 nm. The inner pin layer 33 may also have a multilayer structure that preferably comprises in order from the side of the nonmagnetic intermediate layer 32, for instance, an alloy layer of $CO_{50-70}Fe$ (atomic %), a Heusler alloy layer and an alloy layer of $FeCO_{30-50}$. Further, the Heusler alloy layer may be sandwiched between Fe layers.

(Explanation of the Antiferromagnetic Layer 22)

The antiferromagnetic layer 22 works such that by way of exchange coupling with the fixed magnetization layer 30 as described above, the magnetization direction of the fixed magnetization layer 30 is fixed.

For instance, the antiferromagnetic layer 22 is made of an antiferromagnetic material containing at least one element M' selected from the group of Pt, Ru, Rh, Pd, Ni, Cu, Ir, Cr and Fe, and Mn. The content of Mn is preferably 35 to 95 at %. The antiferromagnetic material is roughly broken down into two types: (1) a non-heat treatment type antiferromagnetic material that shows anti-ferromagnetism even in the absence of heat treatment to induce an exchange coupling magnetic field between it and a ferromagnetic material, and (2) a heat treatment type antiferromagnetic material that comes to show anti-ferromagnetism by heat treatment. In the invention, both types (1) and (2) may be used without restriction. For instance, the non-heat treatment type antiferromagnetic material is exemplified by RuRhMn, FeMn, and IrMn, and the heat treatment type antiferromagnetic material is exemplified by PtMn, NiMn, and PtRhMn.

The antiferromagnetic layer 22 has a thickness of about 5 to 30 nm.

The underlay layer 21 formed below the anti-ferromagnetic layer 22 is provided to improve the crystallization and orientation of each of the layers stacked on it in general, and the exchange coupling of the antiferromagnetic layer 22 and the fixed magnetization layer 30 in particular. For such underlay layer 21, for instance, a multilayer structure of Ta and NiCr layers is used. The underlay layer 21 has a thickness of typically about 2 to 6 nm.

Referring now to the insulating layer 4, it is made typically of an alumina material. For the bias magnetic field-applying layer 6, for instance, use is made of a hard magnetic layer (hard magnet) or a multilayer arrangement of a ferromagnetic layer and an anti-ferromagnetic layer, specifically, CoPt, and CoCrPt.

(Explanation of the Nonmagnetic Spacer Layer 24)

The nonmagnetic spacer layer 24 is interleaved between the fixed magnetization layer 30 and the free layer 50. The nonmagnetic spacer layer 24 is made typically of a nonmagnetic electroconductive material containing at least one from the group consisting of Cu, Au and Ag in an amount of at least 80% by weight, and has a thickness of, for instance, about 1 to 4 nm.

(Explanation of the Free Layer 50)

The free layer 50, for instance, is constructed from a Co-containing alloy layer; it is preferably constructed of a magnetic alloy layer having a body-centered cubic structure comprising a CoFe alloy as an example. The content of Co is preferably 50 to 90 at %, because there is then a high polarizability achieved with a small coercive force demanded for the free layer to have. Preferable for this is an alloy layer of $CO_{50-90}Fe$ (atomic %). The free layer 50 has a thickness of about 2 to 10 nm, especially about 3 to 7 nm.

The free layer 50 may also have a multilayer structure that, for instance, comprises in order from the side of the nonmagnetic spacer layer 24 an alloy layer of $CO_{50-90}Fe$, and a Heusler alloy layer which may be sandwiched between Fe layers.

On such free layer 50, there is a protective layer 26 formed, which comprises a Ru layer as an example. The protective layer 26 has a thickness of about 0.5 to 10 nm.

In the embodiment of the invention, as already mentioned, the nonmagnetic metal layer 27 (the "metal gap") made of Ta or the like is formed between the CPP-GMR device 5 and the second shield layer 8. The thickness of that nonmagnetic layer is determined such that the position of the free layer is brought at substantially the center between the shields. The nonmagnetic metal layer 27 has a thickness of 5 to 20 nm, and the total thickness of the metal layer 27 plus a cap layer is about 100 to 300 nm.

(Explanation of the Whole Construction of the Thin-Film Magnetic Head)

The whole construction of the thin-film magnetic head comprising the aforesaid magneto-resistive effect device is now explained. As already mentioned, FIGS. 5 and 6 are illustrative of the construction of the thin-film magnetic head according to one preferred embodiment of the invention; FIG. 5 is illustrative of a section of the thin-film magnetic head perpendicular to the ABS and a substrate and FIG. 6 is illustrative of a section of a magnetic pole portion of the thin-film magnetic head parallel with the ABS.

The whole structure of the thin-film magnetic head will be better understood when consideration is given to its fabrication process steps; the whole structure of the thin-film magnetic head is now explained with reference to its fabrication process steps.

First of all, an insulating layer 2 comprising an insulating material such as alumina ($Al_2O_3$) or silicon oxide ($SiO_2$) is formed by sputtering or like techniques on a substrate 1 comprising a ceramic material such as AlTiC ($Al_2O_3$.TiC). That insulating layer has a thickness of about 0.5 to 20 μm as an example.

Then, a lower shield layer 3 comprising a magnetic material and adapted for a reproducing head is formed on that insulating layer 2. The shield layer 3 has a thickness of about 0.1 to 5 μm as an example. The magnetic material used for such lower shield layer 3, for instance, includes FeAlSi, NiFe, CoFe, CoFeNi, FeN, FeZrN, FeTaN, CoZrNb, and CoZrTa. The lower shield layer 3 is formed by sputtering, plating or like other techniques.

Then, a reproducing CPP-GMR device 5 is formed on the lower shield layer 3.

Although not shown, an insulating film is then formed in such a way as to cover two sides of the CPP-GMR device and the upper surface of the first shield layer 3. The insulating film is formed of an insulating material such as alumina.

Then, two bias magnetic field-applying layers 6 are formed in such a way as to be adjacent to the two sides of the CPP-GMR device 5 via the insulating layer. Then, an insulating film 7 is formed in such a way as to be located around the CPP-GMR device 5 and bias magnetic field-applying layers 6. The insulating film 7 is formed of an insulating material such as alumina.

Then, a second shield layer 8 for the reproducing head, comprising a magnetic material, is formed after the stacking of a nonmagnetic metal layer 27 ("metal gap") on the CPP-GMR device 5, bias magnetic field-applying layers 6 and insulating layer 7. The second shield layer 8, for instance, is formed by means of plating or sputtering.

Then, a separation layer 18 comprising an insulating material such as alumina is formed by sputtering or the like on the upper shield layer 8. Then, a lower magnetic pole layer 19, comprising a magnetic material and adapted for a recording head, is formed by plating, sputtering or the like on the separation layer 18. The magnetic material used for the second shield layer 8, and the lower magnetic pole layer 19, for instance, includes a soft magnetic material such as NiFe, CoFe, CoFeNi, and FeN. It is here noted that instead of the multilayer arrangement of the second shield layer 8, separation layer 18 and lower magnetic pole layer 19, it is acceptable to configure the second shield layer in such a way as to work also as a lower electrode layer.

Then, a recording gap layer 9 comprising a non-magnetic material such as alumina is formed by sputtering or the like on the lower magnetic pole layer 19. That recording gap layer has a thickness of about 50 to 300 nm.

For the formation of a magnetic path, the recording gap layer 9 is then partially etched at the center of the thin-film coil to be described later to form a contact hole 9a.

Then, a first layer portion 10 of the thin-film coil, typically comprising copper (Cu), is formed on the recording gap layer 9 at a thickness of typically 2 to 3 μm. In FIG. 5, note that reference numeral 10a stands for a connector portion of the first layer portion 10, which is to be connected to a second layer portion 15 of the thin-film coil to be described later. The first layer portion 10 is wound around the contact hole 9a.

Then, an insulating layer 11 comprising a photo-resist or other organic material having fluidity upon heating is formed in such a given pattern as to cover the first layer portion 10 of the thin-film coil and the surrounding recording gap layer 9.

Then, the insulating layer 11 is heat treated at a given temperature to make its surface flat. By this heat treatment, each of the edge portions of the outer and inner peripheries of the insulating layer 11 is configured into a rounded slant.

Then, in an area of the insulating layer 11 from a slant portion on the medium opposite plane 20 (to be described later) side to the medium opposite plane 20 side, a track width-setting layer 12a of an upper magnetic pole layer 12 is formed on the recording gap layer 9 and insulating layer 11, using the magnetic material for the recording head. The upper magnetic pole layer 12 is made up of that track width-setting layer 12a, and a coupler portion layer 12b and a yoke portion layer 12c to be described later.

The track width-setting layer 12a is formed on the recording gap layer 9, including an end portion that provides a magnetic pole portion of the upper magnetic pole layer 12 and a connector portion that is formed on the slant portion of the insulating layer 11 on the medium opposite plane 20 side and connected to the yoke portion layer 12c. The width of that end portion is set equal to the recording track width, and the width of the connector portion is greater than the width of the end portion.

Simultaneously with the formation of the track width-setting layer 12a, the coupler portion 12b comprising a magnetic material is formed on the contact hole 9a and a connector layer 13 comprising a magnetic material is formed on the connector portion 10a. The coupler portion layer 12b forms a portion of the upper magnetic pole layer 12, which is to be magnetically connected to the upper shield layer 8.

Then, magnetic pole trimming is carried out. That is, in an area around the track width-setting layer 12a, the track width-setting layer 12a is used as a mask to etch at least a part of the recording gap layer 9 and the magnetic pole portion of the upper shield layer 8 on the recording gap layer 9 side, whereby, as shown in FIG. 6, there is a trim structure formed, in which at least a part of the magnetic pole portion of the upper magnetic pole layer 12, the recording gap layer 9 and the magnetic pole portion of the upper shield layer 8 has a uniform width. This trim structure makes sure prevention of an effective increase in the track width due to the spread of a magnetic flux near the recording gap layer 9.

Then, an insulating layer 14 comprising alumina or other inorganic insulating material is formed around the whole at a thickness of typically 3 to 4 μm.

Then, that insulating layer 14 is polished by chemo-mechanical polishing or the like as far as the surfaces of the track width-setting layer 12a, coupler portion layer 12b and connector layer 13 for flattening.

Then, the second layer portion 15 of the thin-film coil typically comprising copper (Cu) is formed on the flattened insulating layer 14 at a thickness of typically 2 to 3 μm. In FIG. 5, note that reference numeral 15a is indicative of a connector portion of the second layer portion 15, which is to be connected to the connector portion 10a of the first layer portion 10 of the thin-film coil by way of the connector layer 13. The second layer portion 15 is wound around the coupler portion layer 12b.

Then, an insulating layer 16 comprising a photo-resist or other organic material having fluidity upon heating is formed in such a given pattern as to cover the second layer portion 15 of the thin-film coil and the surrounding insulating layer 14.

Then, the insulating layer 16 is heat treated at a given temperature to make its surface flat. By this heat treatment, each of the edge portions of the outer and inner peripheries of the insulating layer 16 is configured into a rounded slant.

Then, the magnetic material for the recording head such as permalloy is used to form the yoke portion layer 12c forming the yoke portion of the upper magnetic layer 12 on the track width-setting layer 12a, insulating layers 14, 16 and coupler portion layer 12b. An end of the yoke layer portion 12c on the medium opposite plane 20 side is spaced away from the medium opposite plane 20, and the yoke portion layer 12c is connected to the lower magnetic pole layer 19 by way of the coupler portion layer 12b.

Then, an overcoat layer 17 typically comprising alumina is formed in such a way as to cover the whole. Finally, a slider including the aforesaid respective layers is machined to form the medium opposite plane 20 of the thin-film head including the recording head and reproducing head in the form of a complete thin-film magnetic head.

The thus fabricated thin-film magnetic head comprises the medium opposite plane 20 in opposition to the recording medium, the aforesaid reproducing head and the recording head (induction type of magnetic device).

The magnetic head comprises the lower and upper magnetic pole layers 19 and 12 that include mutually opposite magnetic pole portions on the medium opposite plane 20 side and are magnetically coupled to each other, the recording gap layer 9 located between the magnetic pole portion of the lower magnetic pole layer 19 and the magnetic pole portion of the upper magnetic pole layer 12, and the thin films 10, 15 at least a part of which is located between the lower 19 and the upper magnetic pole layer 12 while insulated from them.

As shown in FIG. 5, such a thin-film magnetic head has a throat height (indicated by TH in the drawing) that is defined by a length from the medium opposite plane 20 up to the end of the insulating layer 11 on the medium opposite plane side. Note here that the "throat height" means a length (height) from the medium opposite plane 20 to a position at which the two magnetic pole layers start being spaced away.

(Explanation of how the Thin-film Magnetic Head Works)

How the thin-film magnetic head according to the embodiment here works is now explained. The thin-film magnetic head records information in the recording medium by the recording head, and plays back the information recorded in the recording medium by the reproducing head.

At the reproducing head, the direction of a bias magnetic field applied by the bias magnetic field-applying layers 6 is orthogonal to a direction perpendicular to the medium opposite plane 20. At the CPP-GMR device 5 with no signal magnetic field applied yet, the magnetization direction of the free layer 50 lies in the direction of the bias magnetic field, and the magnetization direction of the fixed magnetization layer 30 is fixed in a direction perpendicular to the medium opposite plane 20.

At the CPP-GMR device 5, there is a change in the magnetization direction of the free layer 50 depending on a signal magnetic field from the recording medium, which in turn causes a change in the relative angle between the magnetization direction of the free layer 50 and the magnetization direction of the fixed magnetization layer 30, with the result that there is a change in the resistance value of the CPP-GMR device 5. The resistance value of the CPP-GMR device 5 may be found from a potential difference between the first and second shield layers, i.e., the two electrode layers 3 and 8 at the time when a sense current is passed through the CPP-MR device 5. It is thus possible for the reproducing head to play back the information recorded in the recording medium.

(Explanation of the Head Gimbal Assembly and the Hard Disk System)

The head gimbal assembly and the hard disk system according to the embodiment here are now explained.

A slider 210 included in the head gimbal assembly is first explained with reference to FIG. 7. In the magnetic disk system, the slider 210 is located in such a way as to face a hard disk that is a rotationally driven disk-form recording medium. This slider 210 primarily comprises a substrate 211 built up of a substrate 1 and an overcoat 17 depicted in FIG. 5.

The substrate 211 is in a generally hexahedral shape. Of the six surfaces of the substrate 211, one surface is in opposition to the hard disk. On that one surface there is a medium opposite plane 20 formed.

As the hard disk rotates in the z-direction in FIG. 7, it causes an air flow passing between the hard disk and the slider 210 to induce lift relative to the slider 210 in the downward y-direction in FIG. 7. This lift in turn causes the slider 210 to levitate over the surface of the hard disk. Note here that the x-direction in FIG. 7 traverses tracks on the hard disk.

Near the end of the slider 210 on an air exit side (the left lower end in FIG. 7), there is the thin-film magnetic head 100 formed according to the invention.

A head gimbal assembly 220 according to this embodiment is now explained with reference to FIG. 8. The head gimbal assembly 220 comprises a slider 210 and a suspension 221 adapted to resiliently support that slider 210. The suspension 221 comprises a leaf spring-form load beam 222 formed typically of stainless steel, a flexure 223 attached to one end of the load beam 222 and having the slider 210 joined to it for giving a suitable degree of flexibility to the slider 210, and a base plate 224 attached to the other end of the load beam 222.

The base plate 224 is adapted to be attached to an arm 230 of an actuator for moving the slider 210 in the track traverse direction x of the hard disk 262. The actuator comprises the arm 230 and a voice coil motor for driving that arm 230. At a portion of the flexure 223 having the slider 210 attached to it, there is a gimbal portion provided for keeping the posture of the slider 210 constant.

The head gimbal assembly 220 is attached to the arm 230 of the actuator. The head gimbal assembly 220 attached to one arm 230 is called a head arm assembly, whereas the head gimbal assembly 220 attached to a carriage at its plurality of arms is referred to as a head stack assembly.

FIG. 8 illustrates one example of the head arm assembly, wherein the head gimbal assembly 220 is attached to one end of the arm 230. To the other end of the arm 230, a coil 231 forming a part of the voice coil motor is attached. Halfway across the arm 230, there is a bearing portion 233 attached to a shaft 234 adapted to support the arm 230 in a pivotal fashion.

One example of the head stack assembly and the hard disk system according to the instant embodiment are now explained with reference to FIGS. 9 and 10.

FIG. 9 is illustrative of part of the hard disk system, and FIG. 10 is a plan view of the hard disk system.

A head stack assembly 250 comprises a carriage 251 having a plurality of arms 252. The plurality of arms 252 are provided with a plurality of the head gimbal assemblies 220 such that they line up vertically at an interval. On the side of the carriage 251 that faces away from the arms 252, there is a coil 253 attached, which coil becomes a part of the voice coil motor. The head stack assembly 250 is incorporated in the hard disk system.

The hard disk system comprises a plurality of hard disks 262 attached to a spindle motor 261. For each hard disk 262, two sliders 210 are located such that they are opposite to each other with the hard disk 262 held between them. The voice coil motor has also permanent magnets 263 located at opposite positions with the coil 253 of the head stack assembly 250 held between them.

The head stack assembly 250 except the slider 210 and the actuator correspond to the positioning device here which is operable to support the slider 210 and position it relative to the hard disk 262.

With the hard disk system here, the actuator is actuated to move the slider 210 in the track traverse direction of the hard disk 262, thereby positioning the slider 210 with respect to the hard disk 262. The thin-film magnetic head incorporated in the slider 210 works such that information is recorded by a recording head in the hard disk 262, and the information recorded in the hard disk 262 is played back by a reproducing head.

The head gimbal assembly and the hard disk system here have pretty much the same action as the thin-film magnetic head according to the foregoing embodiment.

While the embodiment here has been described with reference to the thin-film magnetic head of the structure wherein the reproducing head is located on the substrate side and the recording head is stacked on the reproducing head, it is contemplated that that order of stacking could be reversed. When the thin-film magnetic head here is used as a read-only head, the recording head could be removed from it.

It is also contemplated that part of the invention may be applied not only to magnetic heads but also as a so-called thin-film magnetic field sensor adapted to detect a magnetic field.

EXAMPLES

The invention concerning the CPP-GMR device as described above is now explained in more details with reference to the following specific examples.

Experimental Example I

What influences the relation between the device size represented by the width W1 and the taper angle $\theta 1$ had on making the outer pin layer 31 thin were studied.

The multilayer arrangement of the CPP-GMR device was set up as follows.

(Multilayer Arrangement of the CPP-GMR Device)
Protective layer 26: made of Ru at a thickness of 10 nm
Free layer 50: made of $Co_{90}Fe_{10}$ at a thickness of 5 nm
Nonmagnetic spacer layer 24: made of Cu at a thickness of 3 nm
Inner pin layer 33: made of $CO_{70}Fe_{30}$ at a thickness of 7 nm
Nonmagnetic intermediate layer 32: made of Ru at a thickness of 0.8 nm
Outer pin layer 31: made of $CO_{70}Fe_{30}$ at a thickness of X nm (X: the thickness to be found)
Antiferromagnetic layer 22: made of IrMn at a thickness of 7 nm
Underlay layer 21: made of NiFeCr (5 nm)/Ta (1 nm)

Consider here only the fixed magnetization layer 30 consisting of the inner pin layer 33, nonmagnetic intermediate layer 32 and outer pin layer 31 picked up out of the aforesaid film arrangement of the CPP-GMR device. The thickness of the inner pin layer 33 was fixed at 7 nm, the thickness of the nonmagnetic intermediate layer 32 of synthetic coupling was fixed at 0.8 nm, and the thickness of the outer pin layer 31 was set at the thickness X to be found in nm.

Two inner pin layers 33 of widths W1=150 nm and W1=50 nm were provided. FIGS. 11A and 11B are conceptual representations of the morphologies of the fixed magnetization layers 30 comprising each one inner pin layer and having varied taper angles of 80°, 70°, 60°, 45° and 30°.

The thickness X (nm) of the outer pin layer 31 was determined such that the area ratio between the area of the inner pin layer 33 corresponding to each taper angle $\theta 1$ shown in FIGS. 11A and 11B and the area of the outer pin layer 31 became 1, and to what degree the outer pin layer 31 was thinned, P=[1−(X/7)]×100 (%), was worked out.

The area ratio is set at 1 for the following reason. That is, the fixed magnetization layer 30 has a synthetic pinned structure, and so the magnetic volume ratio (Mso×V2)/(Msi×V1), represented by the ratio of the (Mso×V2) that is the product of the saturation magnetization Mso and volume V2 of the outer pin layer 31 relative to the (Msi×V1) that is the product of the saturation magnetization Msi and volume V1 of the inner pin layer 33, must be in the range of 0.9 to 1.1 and in a well-balanced state. In the example here, (Mso×V2)/(Msi×V1)=1.0. And, in the state of FIGS. 11A and 11B, only the area ratio=1 may be factored in, because the inner 33 and the outer pin layer 31 are made of the same material, and their lengths in the depth direction of the drawing sheet are taken as being the same as the reference unit length (consider $\theta=90°$ in FIG. 4).

The results are set out in the following table 1.

TABLE 1

|  | W1 (nm) | $\theta 1$ (deg.) | Degree of thinning P (%) |
|---|---|---|---|
| FIG. 11A | 150 | 80 | 1.9 |
|  | 150 | 70 | 3.6 |
|  | 150 | 60 | 5.4 |
|  | 150 | 45 | 8.7 |
|  | 150 | 30 | 13.5 |
| FIG. 11B | 50 | 80 | 5.7 |
|  | 50 | 70 | 10.0 |
|  | 50 | 60 | 14.3 |
|  | 50 | 45 | 20.0 |
|  | 50 | 30 | 28.6 |

From the results of Table 1 it is found that as the size of W1 decreases from 150 nm to 50 nm and the taper angle $\theta 1$ grows small, there is an increase in the degree of thinning, P, of the outer pin layer 31. More specifically, when the size of W1 is 50 nm and the taper angle $\theta 1$ becomes less than 60°, the outer pin layer 31 would have a degree of thinning, P, of at least 14.3%. As a result, the inter-shield gap could be much more narrowed with the achievement of ever higher recording densities.

Experimental Example II

What influences the relations between the device size represented by the width W1 (FIG. 2) and length L1 (FIG. 4) as shown in FIGS. 1-4, the taper angle $\theta 1$ (FIG. 2) and the angle of inclination 62 (FIG. 4) had on making the outer pin layer 31 thin were studied.

The gap layer 27 and the multilayer arrangement of the CPP-GMR device were set up as follows.
Gap layer 27: made of Ta at a thickness of 20 nm
Protective layer 26: made of Ru at a thickness of 10 nm
Free layer 50: made of $Co_{90}Fe_{10}$ at a thickness of 5 nm Nonmagnetic spacer layer 24: made of Cu at a thickness of 3 nm
Inner pin layer 33: made of $CO_{70}Fe_{30}$ at a thickness of 7 nm
Nonmagnetic intermediate layer 32: made of Ru at a thickness of 0.8 nm
Outer pin layer 31: made of $CO_{70}Fe_{30}$ at a thickness of X nm (X: the parameter thickness)
Antiferromagnetic layer 22: made of IrMn at a thickness of 7 nm
Underlay layer 21: made of NiFeCr (5 nm)/Ta (1 nm)

Consider here only the fixed magnetization layer 30 consisting of the inner pin layer 33, nonmagnetic intermediate layer 32 and outer pin layer 31 picked up out of the aforesaid film arrangement of the CPP-GMR device.

The magnetic volume ratio (Mso×V2)/(Msi×V1), represented by the ratio of the (Mso×V2) that is the product of the saturation magnetization Mso and volume V2 of the outer pin layer 31 relative to the (Msi×V1) that is the product of the saturation magnetization Msi and volume V1 of the inner pin layer 33, must be in the range of 0.9 to 1.1 and in a well-balanced state. In the example here, (Mso×V2)/(Msi×V1) =1.0. Because both layers 33, 31 are made of the same material, only V1/V1 that is the ratio between the volume V1 of the inner pin layer 33 and the volume V2 of the outer pin layer 31 may be factored in. For the magnetic thickness ratio (Mso-t2)/(Msi×t1), too, only t1/t2 may just as well be factored in.

The thickness of the inner pin layer 33 was fixed at 7 nm, the thickness of the nonmagnetic intermediate layer 32 of synthetic bonding was fixed at 0.8 nm, and the thickness of the outer pin layer 33 was given the variable X (nm). With W1=L1=50 nm, the thickness t2 of the outer pin layer 31 was found at the volume ratio (V2/V1)=1 while θ1 and θ2 were varied as set out in Table 2. In addition, the layer thickness ratio (t2/t1) was figured out from the value of t2. The layer thickness ratio (t2/t1) here is the ratio of the thickness t2 of the outer pin layer 31 relative to the thickness t1 of the inner pin layer 33.

TABLE 2

| | t1 (nm) | t2 (nm) | W1 (nm) | L1 (nm) |
|---|---|---|---|---|
| 2-1-1* | 7 | 6.05 | 50 | 50 |
| 2-1-2* | 7 | 5.8 | 50 | 50 |
| 2-1-3 | 7 | 5.5 | 50 | 50 |
| 2-1-4 | 7 | 5.35 | 50 | 50 |
| 2-1-5 | 7 | 5.2 | 50 | 50 |
| 2-2-1* | 7 | 5.9 | 50 | 50 |
| 2-2-2* | 7 | 5.7 | 50 | 50 |
| 2-2-3 | 7 | 5.4 | 50 | 50 |
| 2-2-4 | 7 | 5.24 | 50 | 50 |
| 2-2-5 | 7 | 5.1 | 50 | 50 |
| 2-3-1* | 7 | 5.75 | 50 | 50 |
| 2-3-2 | 7 | 5.5 | 50 | 50 |
| 2-3-3 | 7 | 5.25 | 50 | 50 |
| 2-3-4 | 7 | 5.15 | 50 | 50 |
| 2-3-5 | 7 | 5.0 | 50 | 50 |
| 2-4-1* | 7 | 5.7 | 50 | 50 |
| 2-4-2 | 7 | 5.45 | 50 | 50 |
| 2-4-3 | 7 | 5.2 | 50 | 50 |
| 2-4-4 | 7 | 5.05 | 50 | 50 |
| 2-4-5 | 7 | 4.95 | 50 | 50 |
| 2-5-1* | 7 | 5.6 | 50 | 50 |
| 2-5-2 | 7 | 5.35 | 50 | 50 |
| 2-5-3 | 7 | 5.15 | 50 | 50 |
| 2-5-4 | 7 | 5.0 | 50 | 50 |
| 2-5-5 | 7 | 4.9 | 50 | 50 |

| | θ1 (deg.) | θ2 (deg.) | t2/t1 | V2/V1 |
|---|---|---|---|---|
| 2-1-1* | 70 | 70 | 0.86 | 1.0 |
| 2-1-2* | 60 | 70 | 0.83 | 1.0 |
| 2-1-3 | 50 | 70 | 0.79 | 1.0 |
| 2-1-4 | 45 | 70 | 0.76 | 1.0 |
| 2-1-5 | 40 | 70 | 0.74 | 1.0 |
| 2-2-1* | 70 | 60 | 0.84 | 1.0 |
| 2-2-2* | 60 | 60 | 0.81 | 1.0 |
| 2-2-3 | 50 | 60 | 0.77 | 1.0 |
| 2-2-4 | 45 | 60 | 0.75 | 1.0 |
| 2-2-5 | 40 | 60 | 0.73 | 1.0 |
| 2-3-1* | 70 | 50 | 0.82 | 1.0 |
| 2-3-2 | 60 | 50 | 0.79 | 1.0 |
| 2-3-3 | 50 | 50 | 0.75 | 1.0 |
| 2-3-4 | 45 | 50 | 0.74 | 1.0 |
| 2-3-5 | 40 | 50 | 0.71 | 1.0 |
| 2-4-1* | 70 | 45 | 0.81 | 1.0 |
| 2-4-2 | 60 | 45 | 0.78 | 1.0 |
| 2-4-3 | 50 | 45 | 0.74 | 1.0 |
| 2-4-4 | 45 | 45 | 0.72 | 1.0 |
| 2-4-5 | 40 | 45 | 0.71 | 1.0 |
| 2-5-1* | 70 | 40 | 0.81 | 1.0 |
| 2-5-2 | 60 | 40 | 0.76 | 1.0 |
| 2-5-3 | 50 | 40 | 0.74 | 1.0 |
| 2-5-4 | 45 | 40 | 0.71 | 1.0 |
| 2-5-5 | 40 | 40 | 0.70 | 1.0 | t1: the thickness of the inner pin layer
t2: the thickness of the outer pin layer
*Comparative example
V2/V1: the ratio between the volume V2 of the outer pin layer and the volume V1 of the inner pin layer Note here that Table 2 gives nothing about the taper angle θ1 of smaller than 40°. As the taper angle θ1 is much shallower than 40°, it enables the outer pin layer 31 to be much thinner. However, the inventors' experimentation has revealed that at the taper angle θ1 of 40, the width of the uppermost portion of the CPP-GMR device narrows down to about 8 to 10 nm, and as the taper angle θ1 becomes much smaller than 40°, there is the need of increasing the value of W1 up to at least 50 nm. For instance, it has been found that at the taper angle θ1 set at 30°, W1 must be 70 nm; in this case, the t2 of the outer pin layer at which the volume ratio is well balanced is going to become about 5 nm, a figure larger than when W1=50 nm and θ1=40°. In other words, even though the width W1 is much wider than 50 nm and the taper angle θ1 is much smaller than 40°, there would be not that effect.

Experimental Example III

There was experimentation done so as to prove that the magnetic volume ratio (Mso×V2)/(Msi×V1), represented by the ratio of the (Mso×V2) that is the product of the saturation magnetization Mso and volume V2 of the outer pin layer 31 relative to the (Msi×V1) that is the product of the saturation magnetization Msi and volume V1 of the inner pin layer 33, must be in the range of 0.9 to 1.1 under the conditions for sample 2-5-5 (t1=7 nm, W1=L1=50 nm, and θ1=θ2=40°), sample 2-4-4 (t1=7 nm, W1=L1=50 nm, and θ1=θ2=45°), and sample 2-2-2 (t1=7 nm, W1=L1=50 nm, and θ1=θ2=60°) with the thickness t1 of the outer pin layer 31 varied. Note here that V2/V1=0.9 to 1.1 may just as well be factored in, because both pin layers 31, 33 are made of the same material.

An account is now given with reference to the device resistance vs. magnetic field curve graph of FIG. 12.

The background is first explained. As the inner 33 and the outer pin layer 31 are thrown off balance, there is a quicker response obtained to an external magnetic field, although it is ideal that there is a wider flat area involved. When the free layer and the inner pin layer 33 remain antiparallel, there is the maximum resistance value obtained. As the volume V1 of the inner pin layer 33 grows larger, however, the inner pin layer 33 tends to turn in the direction of the external magnetic field, resulting in more premature rotation of magnetization. In extreme cases, there would be no flat area involved.

Here let H1 stand for a magnetic field at which the maximum resistance value has decreased to half, and how this changes in relation to the volume ratio is checked.

The larger the thickness t1 of the inner pin layer 33, the smaller H1 grows. In the absence of the taper θ1, H1 will become small if the thickness t2 of the outer pin layer 31 is reduced by itself. In the presence of the taper θ1, conversely, the thickness t2 of the outer pin layer can be reduced for keeping balance.

It is noted that as H1 grows small, the resistance vs. magnetic field curve loses linearity in the magnetic field under measurement, adversely affecting the shape of output waveform.

As the t2 of the outer pin layer 31 increases, conversely, it causes the outer pin layer 31 to rotate out of the flat area under a negative magnetic field, resulting in an increased resistance. In this case, however, the inner pin layer 33 lies in the direction of the magnetic field; the resistance is unlikely to go back to the maximum because there is no complete reversal. As shown in FIG. 12, the magnetic field having a resistance value half the maximum resistance value in the negative magnetic field is here defined as H2. H2, too, is preferably smaller for better balance.

The value of H1, H2 is desirously at least 1 KOe as an index to the use of the device.

Under that background, both W1 and L1 were fixed at 50 nm, and each of θ1 and θ2 was divided into three levels of 40 deg. (Table 3), 45 deg. (Table 4) and 60 deg. (Table 5). Tables 3, 4 and 5 show the results of measurement of outputs at the varied thickness t2 of the outer pin layer (normalized on the basis of thickness ratio t2/t1=1), PW50 (normalized on the basis of thickness ratio t2/t1=1, H1, and H2.

TABLE 3

|  | t1 (nm) | t2 (nm) | Metal Gap (nm) | Inter-Shield Gap (nm) | W1 (nm) |
|---|---|---|---|---|---|
| 3-1** | 7 | 3 | 16.8 | 58.6 | 50 |
| 3-2** | 7 | 3.5 | 17.3 | 59.6 | 50 |
| 3-3** | 7 | 4 | 17.8 | 60.6 | 50 |
| 3-4* | 7 | 4.5 | 18.3 | 61.6 | 50 |
| 3-5* | 7 | 5 | 18.8 | 62.6 | 50 |
| 3-6* | 7 | 5.3 | 19.1 | 63.2 | 50 |
| 3-7** | 7 | 5.5 | 19.3 | 63.6 | 50 |
| 3-8** | 7 | 6 | 19.8 | 64.6 | 50 |
| 3-9** | 7 | 6.5 | 20.3 | 65.6 | 50 |
| 3-10** | 7 | 7 | 20.8 | 66.6 | 50 |
| 3-11** | 7 | 7.5 | 21.3 | 67.6 | 50 |
| 3-12** | 7 | 8 | 21.8 | 68.6 | 50 |

|  | L1 (nm) | θ1 (deg.) | θ2 (deg.) | t2/t1 | V2/V1 |
|---|---|---|---|---|---|
| 3-1** | 50 | 40 | 40 | 0.43 | 0.59 |
| 3-2** | 50 | 40 | 40 | 0.50 | 0.70 |
| 3-3** | 50 | 40 | 40 | 0.57 | 0.81 |
| 3-4* | 50 | 40 | 40 | 0.64 | 0.92 |
| 3-5* | 50 | 40 | 40 | 0.71 | 1.03 |
| 3-6* | 50 | 40 | 40 | 0.76 | 1.10 |
| 3-7** | 50 | 40 | 40 | 0.79 | 1.14 |
| 3-8** | 50 | 40 | 40 | 0.86 | 1.26 |
| 3-9** | 50 | 40 | 40 | 0.93 | 1.38 |
| 3-10** | 50 | 40 | 40 | 1.00 | 1.50 |
| 3-11** | 50 | 40 | 40 | 1.07 | 1.63 |
| 3-12** | 50 | 40 | 40 | 1.14 | 1.76 |

|  | Output (normalized) | PW50 (normalized) | H1 (kOe) | H2 (kOe) |
|---|---|---|---|---|
| 3-1** | 1 | 0.9 | 0.6 | 2.3 |
| 3-2** | 1 | 0.91 | 0.7 | 2.2 |
| 3-3** | 1 | 0.92 | 0.85 | 1.7 |
| 3-4* | 1 | 0.93 | 1.2 | 1.5 |
| 3-5* | 1 | 0.94 | 1.7 | 1.3 |
| 3-6* | 1 | 0.95 | 1.8 | 1.1 |
| 3-7** | 1 | 0.95 | 1.9 | 0.95 |
| 3-8** | 1 | 0.97 | 2.2 | 0.8 |
| 3-9** | 1 | 0.99 | 2.4 | 0.7 |
| 3-10** | 1 | 1 | 2.5 | 0.6 |
| 3-11** | 1 | 1.01 | 2.6 | 0.45 |
| 3-12** | 1 | 1.03 | 2.65 | 0.4 |

*Inventive
**Comparative
t1: Thickness of the inner pin layer
t2: Thickness of the outer pin layer
t2/t1: Magnetic thickness ratio
V2/V1: Magnetic volume ratio

TABLE 4

|  | t1 (nm) | t2 (nm) | Metal Gap (nm) | Inter-Shield Gap (nm) | W1 (nm) |
|---|---|---|---|---|---|
| 4-1** | 7 | 3 | 16.8 | 58.6 | 50 |
| 4-2** | 7 | 3.5 | 17.3 | 59.6 | 50 |
| 4-3** | 7 | 4 | 17.8 | 60.6 | 50 |
| 4-4** | 7 | 4.5 | 18.3 | 61.6 | 50 |
| 4-5* | 7 | 5 | 18.8 | 62.6 | 50 |
| 4-6* | 7 | 5.1 | 19.1 | 63.2 | 50 |
| 4-7* | 7 | 5.5 | 19.3 | 63.6 | 50 |
| 4-8** | 7 | 6 | 19.8 | 64.6 | 50 |
| 4-9** | 7 | 6.5 | 20.3 | 65.6 | 50 |
| 4-10** | 7 | 7 | 20.8 | 66.6 | 50 |
| 4-11** | 7 | 7.5 | 21.3 | 67.6 | 50 |
| 4-12** | 7 | 8 | 21.8 | 68.6 | 50 |

|  | L1 (nm) | θ1 (deg.) | θ2 (deg.) | t2/t1 | V2/V1 |
|---|---|---|---|---|---|
| 4-1** | 50 | 45 | 45 | 0.43 | 0.57 |
| 4-2** | 50 | 45 | 45 | 0.50 | 0.67 |
| 4-3** | 50 | 45 | 45 | 0.57 | 0.77 |
| 4-4** | 50 | 45 | 45 | 0.64 | 0.88 |
| 4-5* | 50 | 45 | 45 | 0.71 | 0.98 |
| 4-6* | 50 | 45 | 45 | 0.73 | 1.01 |
| 4-7* | 50 | 45 | 45 | 0.79 | 1.09 |
| 4-8** | 50 | 45 | 45 | 0.86 | 1.20 |
| 4-9** | 50 | 45 | 45 | 0.93 | 1.32 |
| 4-10** | 50 | 45 | 45 | 1.00 | 1.43 |
| 4-11** | 50 | 45 | 45 | 1.07 | 1.55 |
| 4-12** | 50 | 45 | 45 | 1.14 | 1.67 |

|  | Output (normalized) | PW50 (normalized) | H1 (kOe) | H2 (kOe) |
|---|---|---|---|---|
| 4-1** | 1 | 0.9 | 0.57 | 2.4 |
| 4-2** | 1 | 0.91 | 0.7 | 2.2 |
| 4-3** | 1 | 0.92 | 0.75 | 2 |
| 4-4** | 1 | 0.93 | 0.95 | 1.6 |
| 4-5* | 1 | 0.94 | 1.4 | 1.5 |
| 4-6* | 1 | 0.94 | 1.6 | 1.4 |
| 4-7* | 1 | 0.95 | 1.8 | 1.2 |
| 4-8** | 1 | 0.97 | 2.1 | 0.8 |
| 4-9** | 1 | 0.99 | 2.3 | 0.7 |
| 4-10** | 1 | 1 | 2.4 | 0.6 |
| 4-11** | 1 | 1.01 | 2.5 | 0.5 |
| 4-12** | 1 | 1.03 | 2.6 | 0.45 |

*Inventive
**Comparative
t1: Thickness of the inner pin layer
t2: Thickness of the outer pin layer
t2/t1: Magnetic thickness ratio
V2/V1: Magnetic volume ratio

TABLE 5

| | t1 (nm) | t2 (nm) | Metal Gap (nm) | Inter-Shield Gap (nm) | W1 (nm) |
|---|---|---|---|---|---|
| 5-1** | 7 | 3 | 16.8 | 58.6 | 50 |
| 5-2** | 7 | 3.5 | 17.3 | 59.6 | 50 |
| 5-3** | 7 | 4 | 17.8 | 60.6 | 50 |
| 5-4** | 7 | 4.5 | 18.3 | 61.6 | 50 |
| 5-5** | 7 | 5 | 18.8 | 62.6 | 50 |
| 5-6* | 7 | 5.5 | 19.3 | 63.6 | 50 |
| 5-7** | 7 | 6 | 19.8 | 64.6 | 50 |
| 5-8** | 7 | 6.5 | 20.3 | 65.6 | 50 |
| 5-9** | 7 | 7 | 20.8 | 65.6 | 50 |
| 5-10** | 7 | 7.5 | 21.3 | 67.6 | 50 |
| 5-11** | 7 | 8 | 21.8 | 68.6 | 50 |

| | L1 (nm) | θ1 (deg.) | θ2 (deg.) | t2/t1 | V2/V1 |
|---|---|---|---|---|---|
| 5-1** | 50 | 60 | 60 | 0.43 | 0.51 |
| 5-2** | 50 | 60 | 60 | 0.50 | 0.60 |
| 5-3** | 50 | 60 | 60 | 0.57 | 0.69 |
| 5-4** | 50 | 60 | 60 | 0.64 | 0.78 |
| 5-5** | 50 | 60 | 60 | 0.71 | 0.88 |
| 5-6* | 50 | 60 | 60 | 0.79 | 0.97 |
| 5-7** | 50 | 60 | 60 | 0.86 | 1.07 |
| 5-8** | 50 | 60 | 60 | 0.93 | 1.16 |
| 5-9** | 50 | 60 | 60 | 1.00 | 1.26 |
| 5-10** | 50 | 60 | 60 | 1.07 | 1.36 |
| 5-11** | 50 | 60 | 60 | 1.14 | 1.46 |

| | Output (normalized) | PW50 (normalized) | H1 (kOe) | H2 (kOe) |
|---|---|---|---|---|
| 5-1** | 1 | 0.9 | 0.5 | 2.5 |
| 5-2** | 1 | 0.91 | 0.6 | 2.4 |
| 5-3** | 1 | 0.92 | 0.68 | 2.2 |
| 5-4** | 1 | 0.93 | 0.75 | 1.9 |
| 5-5** | 1 | 0.94 | 0.95 | 1.6 |
| 5-6* | 1 | 0.95 | 1.5 | 1.5 |
| 5-7** | 1 | 0.97 | 1.8 | 1.2 |
| 5-8** | 1 | 0.99 | 2 | 0.95 |
| 5-9** | 1 | 1 | 2.2 | 0.8 |
| 5-10** | 1 | 1.01 | 2.4 | 0.7 |
| 5-11** | 1 | 1.03 | 2.5 | 0.6 |

*Inventive
**Comparative
t1: Thickness of the inner pin layer
t2: Thickness of the outer pin layer
t2/t1: Magnetic thickness ratio
V2/V1: Magnetic volume ratio From the results of Tables 3, 4 and 5, it has been found that in the examples of the invention, the volume ratio is balanced where the thickness ratio is a lot more off balance, with H1 and H2 lying in a suitable range.

That is, throughout the examples of the invention shown in Tables 3, 4 and 5, the magnetic volume ratio is balanced in the range of 0.9 to 1.1, with a magnetic thickness ratio of up to 0.8. And in such ranges, there is a gain of at least 5% obtained at PW50, with the achievement of the target H1 and H2.

H1, and H2 in the tables was determined from the resistance vs. magnetic field curves measured under an applied voltage condition of 80 mV and an applied magnetic field condition of 8 KOe, and PW50 was found by comparing the results of estimation of the electromagnetic characteristics after the head gimbal assembly was set up.

What we claim is:

1. A giant magneto-resistive effect device (GMR device) having a CPP (current perpendicular to plane) structure comprising a nonmagnetic spacer layer, and a fixed magnetized layer and a free layer stacked one upon another with said nonmagnetic spacer layer interleaved between them, with a sense current applied in a stacking direction, characterized in that:
    said free layer functions such that a direction of magnetization changes depending on an external magnetic field, and
    said fixed magnetization layer has a synthetic pinned morphology wherein an inner pin layer and an outer pin layer are stacked one upon another with a nonmagnetic intermediate layer held between them, said inner pin layer being located at a position nearer to said nonmagnetic spacer layer than to said outer pin layer, wherein:
    a width W1 of said inner pin layer at a position tangent to said nonmagnetic spacer layer as viewed from a medium opposite plane is set at 50 nm or less,
    said fixed magnetization layer has tapers at both ends as viewed from a medium opposite plane,
    each of said tapers is tapered down to said non-magnetic spacer layer with the stacking direction of said device as a center axis direction, wherein a taper angle θ1 with respect to a reference line defined by a stacking plane as viewed from a medium opposite plane side is set in an angle range of 40° to 60°,
    a magnetic volume ratio (Mso×V2)/(Msi×V1), represented by a ratio of (Mso×V2) that is a product of a saturation magnetization Mso and a volume V2 of said outer pin layer relative to (Msi×V1) that is a product of a saturation magnetization Msi and a volume V1 of said inner pin layer, lies in a range of 0.9 to 1.1, and
    a magnetic thickness ratio (Mso×t2)/(Msi×t1), represented by a ratio of (Mso×t2) that is a product of a saturation magnetization Mso and a thickness t2 of said outer pin layer relative to (Msi×t1) that is a product of a saturation magnetization Msi and a thickness t1 of said inner pin layer, is set at 0.8 or less.

2. The GMR device of the CPP structure according to claim 1, wherein a width W1 of an upper end portion of said inner pin layer is 10 to 50 nm.

3. The GMR device of the CPP structure according to claim 1, wherein said taper angle θ1 is set in an angle range of 45 to 55°.

4. The GMR device of the CPP structure according to claim 1, wherein said fixed magnetization layer has a slant at an end face in a depth direction as viewed from a section perpendicular to the medium opposite plane, wherein said slant has a morphology that is tapered down to said nonmagnetic spacer layer and an angle of inclination θ2 with a reference as the stacking plane, wherein said angle of inclination θ2 is set in an angle range of 40° to 60°.

5. The GMR device of the CPP structure according to claim 1, wherein said inner pin layer has a length L1 in a depth direction at a position tangent to said non-magnetic spacer layer and at an end face in a depth direction as viewed from a section perpendicular to the medium opposite plane, wherein said length L1 is set at 50 nm or less.

6. The GMR device of the CPP structure according to claim 5, wherein a length L1 of an upper end portion of said inner pin layer is 10 to 50 nm.

7. The GMR device of the CPP structure according to claim 1, wherein said outer pin layer comprises a ferromagnetic layer having a fixed direction of magnetization, and a direction of magnetization of said inner pin layer is fixed in a direction (antiparallel direction) opposite to the direction of magnetization of the ferromagnetic layer in said outer pin layer.

8. The GMR device of the CPP structure according to claim 7, wherein the direction of magnetization of the ferromagnetic layer in said outer pin layer is fixed by action of an antiferromagnetic layer formed tangent to said outer pin layer.

9. The GMR device of the CPP structure according to claim 1, wherein said nonmagnetic spacer layer is made of an electroconductive material.

10. A thin-film magnetic head, characterized by comprising:
   a plane opposite to a recoding medium,
   a GMR device of the CPP structure as recited in claim 1, which is located near said medium opposite plane for detecting a signal magnetic field from said recording medium, and
   a pair of electrodes for passing a current in the stacking direction of said magneto-resistive effect device.

11. A head gimbal assembly, characterized by comprising:
   a slider including a thin-film magnetic head as recited in claim 10 and located in opposition to a recording medium, and
   a suspension adapted to resiliently support said slider.

12. A hard disk system, characterized by comprising:
   a slider including a thin-film magnetic head as recited in claim 10 and located in opposition to a recording medium, and
   a positioning means adapted to support and position said slider with respect to said recording medium.

* * * * *